United States Patent
Brown et al.

(10) Patent No.: US 9,836,936 B1
(45) Date of Patent: Dec. 5, 2017

(54) OBJECT TRACKING SYSTEM

(71) Applicants: James S. Brown, Prairieville, LA (US); Carey S. Solomon, Gonzales, LA (US)

(72) Inventors: James S. Brown, Prairieville, LA (US); Carey S. Solomon, Gonzales, LA (US)

(73) Assignee: C & A Associates, Inc., Denham Springs, LA (US)

( * ) Notice: Subject to any disclaimer, the term of this patent is extended or adjusted under 35 U.S.C. 154(b) by 0 days.

(21) Appl. No.: 14/815,231

(22) Filed: Jul. 31, 2015

Related U.S. Application Data

(60) Provisional application No. 62/032,325, filed on Aug. 1, 2014, provisional application No. 62/063,125, filed on Oct. 13, 2014.

(51) Int. Cl.
  *G08B 21/00* (2006.01)
  *G08B 13/24* (2006.01)

(52) U.S. Cl.
  CPC ..... *G08B 13/2482* (2013.01); *G08B 13/2462* (2013.01)

(58) Field of Classification Search
  CPC ........ G07C 9/00111; G06K 2017/0045; G06Q 10/087
  See application file for complete search history.

(56) References Cited

U.S. PATENT DOCUMENTS

| | | | |
|---|---|---|---|
| 5,661,457 A | 8/1997 | Ghaffari et al. | |
| 5,708,423 A | 1/1998 | Ghaffari et al. | |
| 6,816,075 B2 | 11/2004 | Grunes et al. | |
| 6,900,731 B2 | 5/2005 | Kreiner et al. | |
| 6,909,356 B2 | 6/2005 | Brown et al. | |
| 6,933,849 B2 | 8/2005 | Sawyer | |
| 7,245,221 B2 | 7/2007 | Claudatos et al. | |
| 7,258,276 B2 | 8/2007 | Linton et al. | |
| 7,337,963 B2 | 3/2008 | Harper et al. | |
| 7,468,650 B2 | 12/2008 | Childress et al. | |
| 7,551,089 B2 | 6/2009 | Sawyer | |
| 7,671,718 B2 | 3/2010 | Turner et al. | |
| 7,834,765 B2 | 11/2010 | Sawyer | |
| 7,834,766 B2 | 11/2010 | Sawyer | |
| 7,982,609 B2 | 7/2011 | Padmanabhan et al. | |
| 8,068,023 B2 | 11/2011 | Dulin et al. | |
| 8,130,104 B1 | 3/2012 | Braiman | |
| 8,220,711 B2 | 7/2012 | McIntyre | |
| 8,279,069 B2 | 10/2012 | Sawyer | |
| 2002/0118111 A1* | 8/2002 | Brown | G06Q 10/087 340/573.1 |
| 2005/0137943 A1 | 6/2005 | Holzman | |
| 2005/0190098 A1* | 9/2005 | Bridgelall | G01S 13/32 342/118 |

(Continued)

OTHER PUBLICATIONS

Art Tracking & Security, retrieved from http://www.arttrac.net on Dec. 3, 2013, pp. 1-7.

*Primary Examiner* — Mark Rushing
(74) *Attorney, Agent, or Firm* — Jones Walker LLP

(57) ABSTRACT

An object tracking system including an RFID reader having at least one antenna positioned along an entranceway of an object storage facility. A processor communicates with RFID reader and runs software to perform the steps of: (i) monitoring the phase angle of a target RFID tag; and (iii) returning an indicator of whether the target RFID tag is or is not moving based at least in part on whether the phase angle has changed.

22 Claims, 37 Drawing Sheets

(56) References Cited

U.S. PATENT DOCUMENTS

| | | |
|---|---|---|
| 2006/0072787 A1* | 4/2006 | Claudatos ............ G06Q 20/203 |
| | | 382/103 |
| 2008/0122626 A1* | 5/2008 | Ehrman ................ G06Q 10/08 |
| | | 340/572.1 |
| 2010/0052867 A1 | 3/2010 | Kwok et al. |
| 2010/0156651 A1* | 6/2010 | Broer ..................... G01S 13/74 |
| | | 340/670 |
| 2011/0169917 A1 | 7/2011 | Stephen et al. |
| 2012/0139712 A1* | 6/2012 | Jung ................. G06K 7/10356 |
| | | 340/10.5 |
| 2012/0239568 A1 | 9/2012 | Zughaib et al. |

\* cited by examiner

Item History

Case Number: 14-00012254
Evidence Number: 1
Description: Cell Phone

Baker Police Dept.
9/17/2014 2:44:42 PM

| RFID Number | Action | Input Source | Transaction Date | Officer | Signature |
|---|---|---|---|---|---|
| 064058000000000000003277 | Manual Entry | User | 9/17/2014 2:06:47 PM | Jim Brown | |
| 064058000000000000003277 | Tag | RF2400 | 9/17/2014 2:08:15 PM | Jim Brown | |
| 064058000000000000003277 | Pend Move In | User | 9/17/2014 2:10:00 PM | Jim Brown | |
| 064058000000000000003277 | Moved In | Alien 00:1B:5F:00:51:19 ant:1 | 9/17/2014 2:16:38 PM | Alien Hardware | |
| 064058000000000000003277 | Unscheduled Move | Alien 00:1B:5F:00:51:19 ant:1 | 9/17/2014 2:16:49 PM | Alien Hardware | |
| 064058000000000000003277 | Ignore / Erroneous Read | User | 9/17/2014 2:17:26 PM | Jim Brown | |
| 064058000000000000003277 | Pend Move Out | User | 9/17/2014 2:17:50 PM | Jim Brown | |
| 064058000000000000003277 | Moved Out | Alien 00:1B:5F:00:51:19 ant:1 | 9/17/2014 2:17:51 PM | Alien Hardware | |
| 064058000000000000003277 | Awaiting Signature | | 9/17/2014 2:17:51 PM | Alien Hardware | |
| 064058000000000000003277 | Checked Out (Signed) | T-LBK460-HSB-R | 9/17/2014 2:19:11 PM | Jim Brown | |
| 064058000000000000003277 | Check-In Scan | | 9/17/2014 2:19:27 PM | Jim Brown | |
| 064058000000000000003277 | Pend Move In | RF2400 | 9/17/2014 2:19:27 PM | Jim Brown | |
| 064058000000000000003277 | Moved In | Alien 00:1B:5F:00:51:19 ant:1 | 9/17/2014 2:22:10 PM | Alien Hardware | |
| 064058000000000000003277 | Pend Move Out | User | 9/17/2014 2:27:28 PM | Jim Brown | |
| 064058000000000000003277 | UnPend Move Out | User | 9/17/2014 2:27:33 PM | Jim Brown | |
| 064058000000000000003277 | Pend Move Out | User | 9/17/2014 2:28:03 PM | Jim Brown | |
| 064058000000000000003277 | Moved Out | Alien 00:1B:5F:00:51:19 ant:1 | 9/17/2014 2:31:08 PM | Alien Hardware | |
| 064058000000000000003277 | Awaiting Signature | | 9/17/2014 2:31:08 PM | Alien Hardware | |
| 064058000000000000003277 | Checked Out (Signed) | T-LBK460-HSB-R | 9/17/2014 2:34:37 PM | Jim Brown | *signature* |

Figure 15T

OBJECT TRACKING SYSTEM

CROSS-REFERENCE TO RELATED APPLICATION

This application claims the benefit under 35 USC §119(e) of U.S. provisional application Ser. Nos. 62/032,325 filed Aug. 1, 2014 and 62/063,125 filed Oct. 13, 2014, both of which are incorporated by reference herein in their entirety.

BACKGROUND OF INVENTION

This application relates generally to tracking objects via wireless signals and more specifically to tracking objects using radio frequency identification ("RFID") techniques. In its most basic form, an RFID system uses tags or labels attached to the objects to be identified or tracked. Two-way radio transmitter-receivers called interrogators or readers send a signal to the tag and read its response. RFID tags can be either passive, active or battery-assisted passive. An active tag has an on-board battery and periodically transmits its ID signal. A battery-assisted passive (BAP) tag has a small battery on board and is activated when in the presence of an RFID reader. A passive tag is cheaper and smaller because it has no battery; instead, the tag uses the radio energy transmitted by the reader. The basic operation of the RFID Reader involves the reader generating a radio frequency signal, having the signal "activate" the RFID tags, and the reader receiving the unique reflected signals from the RFID tags.

Although the basic operation of RFID systems are well known in the art, the actual environment in which a system must operate can make reliable and accurate detection of RFID tags technically challenging. For example, determining whether a RFID tag has moved a comparatively short distance (i.e., from one room to another room in the same building) may be uncertain because the RFID reader can detect the tag in both rooms. Also, many objects in the environment may be highly reflective of radio signals, resulting in many "echoes" of both the reader's signal and the tag's reflected signal. Moreover, the sheer number and close proximity of RFID tags in many applications creates an extremely noisy and complex signal environment. Techniques which help resolve the above issues and other problems in RFID systems are always a welcome addition to the art.

SUMMARY OF SELECTED EMBODIMENTS

One embodiment is an object tracking system which includes an RFID reader having at least one antenna positioned along an interior entranceway of an object storage facility and an entry/exit sensor capable of sensing entrance and departure of an individual through the entranceway. A processor communicates with RFID reader and the entry/exit sensor and runs software to perform the steps of:
(i) executing an entrance reading and an exit reading for RFID tags upon an individual entering and exiting, respectively, through the entranceway; (ii) executing an audit reading for RFID tags at least once after the individual has exited the entranceway; and (iii) returning an indicator that a target RFID tag is present in the storage facility if: (1) the target RFID tag is detected upon the entrance reading and not detected on the exit reading; or (2) if the target RFID tag is detected on the exit reading and the target RFID tag is detected on the audit reading.

Another embodiment is an object tracking system including an RFID reader having at least one antenna positioned along an entranceway of an object storage facility. A processor communicates with RFID reader and runs software to perform the steps of: (i) monitoring the phase angle of a target RFID tag; and (iii) returning an indicator of whether the target RFID tag is or is not moving based at least in part on whether the phase angle has changed.

DETAILED DESCRIPTION OF SELECTED EMBODIMENTS

Figure 1:
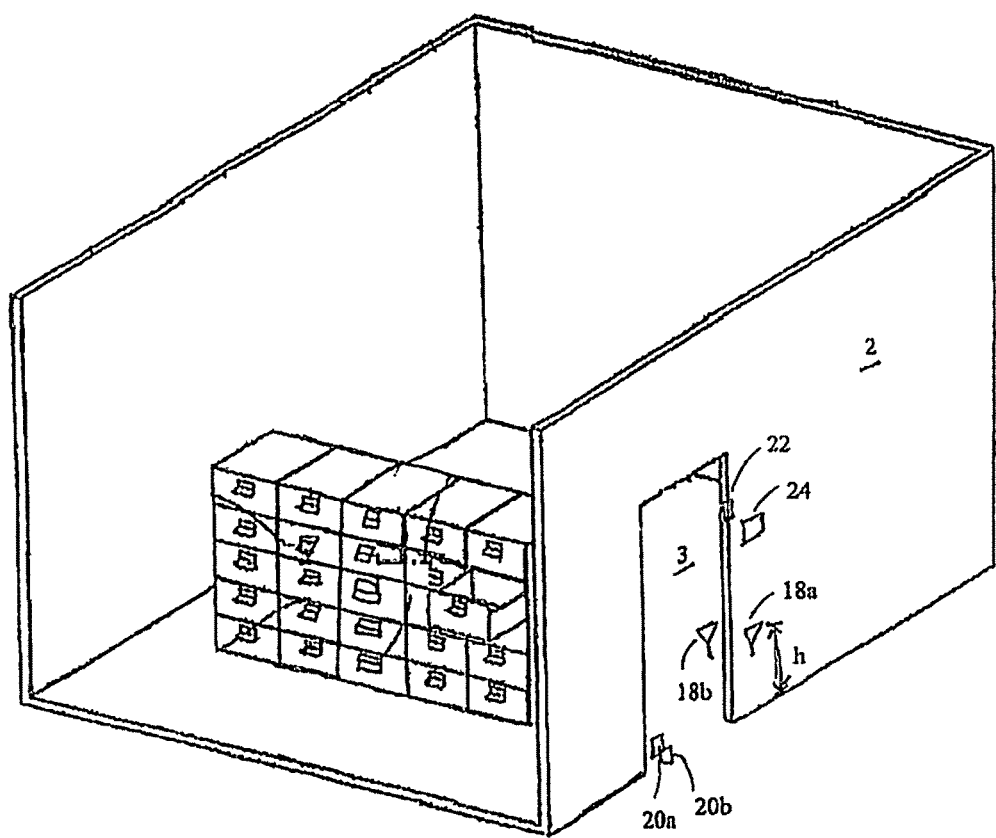
FIG. 1 schematically illustrates an example of a secure enclosure environment in which the current invention could be employed.

FIG. 1 suggests one environment for utilizing the object tracking system described in this application. FIG. 1 illustrates a secure object storage facility 2 having an entranceway 3. "Entranceway" should be understood to mean not only the actual frame of the door, but may include in certain embodiments the path on both sides of the door which a person would normally transverse when entering and exiting the storage area. Although not shown in FIG. 1, it will be understood that this embodiment of storage facility 2 will include a door opening and closing across entranceway 3. In one particular embodiment, storage facility 2 is a law enforcement evidence room and may alternately be described herein as "evidence room" 2. However, it will be understood that the system described herein has application to many different item storage facilities, whether or not a "secure" storage facility and whether or not related to law enforcement functions. The FIG. 1 embodiment shows several system components associated with entranceway 3. First, there is a door sensor 22 which senses when the door across entranceway 3 is opened and closed. In a preferred embodiment, door sensor 22 is a magnetic sensor, but could of course be any conventional or future developed sensor capable of detecting the opening and/or closing of the door. FIG. 1 also shows passageway entry/exit sensor(s) 20 which detect movement (typically of persons) through entranceway 3. In one embodiment, the passageway entry/exit sensor is formed by two photo-electric sensors 20a and 20b positioned about 24 inches above the floor level, with FIG. 1 showing the sensors on the hinge side of the door entranceway. In one preferred embodiment, the sensors 20 are spaced less than six inches apart and most preferably, the sensors are positioned directly adjacent to one another (e.g., less than about one inch apart). A preferred embodiment also positions the two sensors no more than six inches away from the wall or door frame and again, most preferably directly adjacent (e.g., within about an inch) to the wall or door frame.

The two sensors 20a and 20b allow the system to detect the order in which the sensors are passed and thereby allows the system to assign a direction of movement through the entranceway (e.g., into to the evidence room or out of the evidence room). In the illustrated embodiment, the door sensor 22 and passageway entry/exit sensor 20 provide information on potential entry into the room. However, in other embodiments, either of these sensors alone might operate as a general "entry/exit" sensor. Likewise, many other sensor types could provide an indication of entry/exit into the room which in turn triggers many of the system operations described below. Nonlimiting examples of other sensors include laser sensors, light gauging sensors, sonic/ultrasonic sensors, optical/fiber optic sensors, radar sensors, thermal/temperature sensors, infrared sensors, motion detectors, load sensors, or intelligent sensors, such as Microsoft® Kinect®. FIG. 1 also illustrates two RFID antennas 18a and 18b, with one antenna positioned on each side of entranceway 3. FIG. 1 further shows how the antennas 18 are positioned at a height of "h" above the floor of the entranceway. In a preferred embodiment, "h" is between about one foot and about four feet, and most preferably at about three feet. However, other embodiments may position one or more antennas outside this height range. The entranceway 3 may sometimes be referred to as a "chokepoint" since it is intended to be the only path into and out of the secure storage area. Although FIG. 1 illustrates a single entranceway or chokepoint, it will be understood alternate embodiments would include storage areas with multiple entranceways or chokepoints, with each chokepoint having its own antennas (and possibly RFID reader), door sensor, entry/exit sensor, etc. Finally, FIG. 1 illustrates a display panel 24 on the exterior entrance of entranceway 3 which may provide, as described in more detail below, status information regarding the system's current stage of operation.

Figure 2:
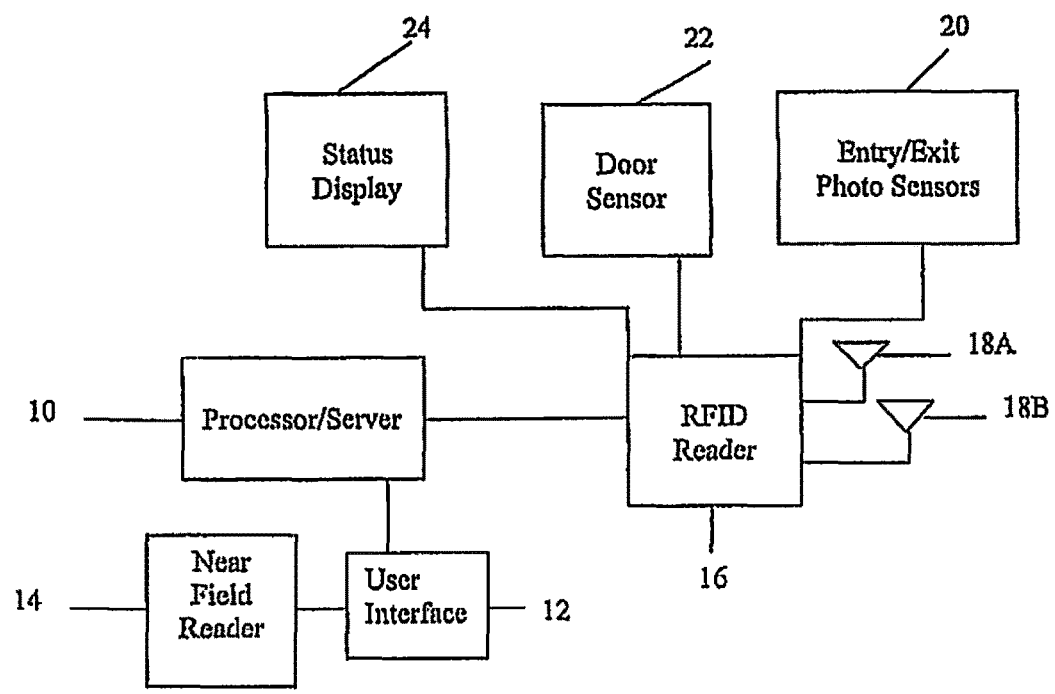
FIG. 2 is component diagram illustrating major electronic components of one embodiment of the invention.

FIG. 2 is a system component diagram illustrating the main electronic components provided in one embodiment of the system. This system will include the computer server 10 (sometimes referred to in the most generic sense as "processor" or "controller" 10) which in turn will interact with user interface 12 for receiving commands and displaying information. The previously referenced status display 24, door sensor 22, and passageway entry/exit sensor 20 likewise interface with server 10. In the FIG. 2 embodiment, display 24, door sensor 22, and passageway entry/exit sensor 20 interface with server 10 indirectly through RFID reader 16. However, in other embodiments, these components could be wired directly to server 10. In the embodiment of the system utilizing RFID tags, an RFID reader 16 will communicate with server 10 and transmit signal through, and receive signal from, the antennas 18. Although two antennas are shown in the figures, alternate embodiments might utilize a single antenna or utilize more than two antennas. In one preferred embodiment, RFID reader 16 may have four ports/channels such as model no. 9900-Plus available from Alien Technology Corporation of Morgan Hill, Calif. One embodiment of the system could utilize two antennas, with each antenna connected to a separate reader port. An alternative embodiment could have two antennas 18 sharing a single port via a signal splitter and a third antenna 18 connected to a second port of the RFID reader. In one embodiment, the RFID Reader 16 is positioned within the secure facility within 20 feet of the antenna and communicates with server 10 through a TCP/IP network. Finally, FIG. 2 illustrates a near field RFID reader (sometimes referred to as a "block") 14 which typically will be positioned near the system's user interface in order to allow a user to "read" RFID tags as the tags are applied to items of evidence (as explained in more detail below).

The basic operation of the RFID Reader involves the reader generating an RF signal, having the signal "activate" the RFID tags, and the reader receiving the unique reflected signals from the RFID tags. In a typical "read session," the RFID reader may be "turned-on" for a short period (e.g., five seconds) to transmit and receive signals in order to "read" the RFID tags within its range. The RFID Reader may process the received tags in different ways to generate different lists of the tags. As one example, the RFID reader may generate a "Tag Stream" list which is simply relaying to the system a raw stream of all RFID tags identified in the read session. This list will include multiple reflections from the same tags and thus, the same tags appear many times in the Tag Stream list. Another example is a "Tag Notify" list, where the Reader processes the stream of tags received in order to generate a list containing a single, distinct copy of each tag (per antenna), i.e., the Tag Notify list contains only a single occurrence of each tag read.

In one embodiment, the system software can be considered in three main components. First, there is the client interface, which in one example is client software running on the evidence officer's PC and may act as the user interface 12 in FIG. 2. Second, a software component sometimes referred to herein as "Listener," which is a Windows® service typically installed on the server 10, will receive data from the RFID reader 16, various sensors described above, the user input, and then carry out the main processing steps described herein. Naturally, the operating system is not limited to Microsoft® architecture and any suitable alternative conventional or future developed operating system (e.g. Unix) could be employed. Third, server 10 will contain an instance of Microsoft SQL Server which will manage the SQL database for the system. The flow charts described herein illustrate the interaction of these software components to provide the overall functionality of the system. Again, the database is not limited to Microsoft® architecture and could be any other suitable database system. In the particular embodiments described in this disclosure, the overall system may sometimes be referred to as the "PADtrax" system and the software component as the PADtrax software.

An RFID tag which the system is specifically attempting to identify for a particular purpose, e.g., to determine if the RFID tag has entered or exited the evidence room, may sometimes be referred to as a "target RFID tag."

Figure 3:
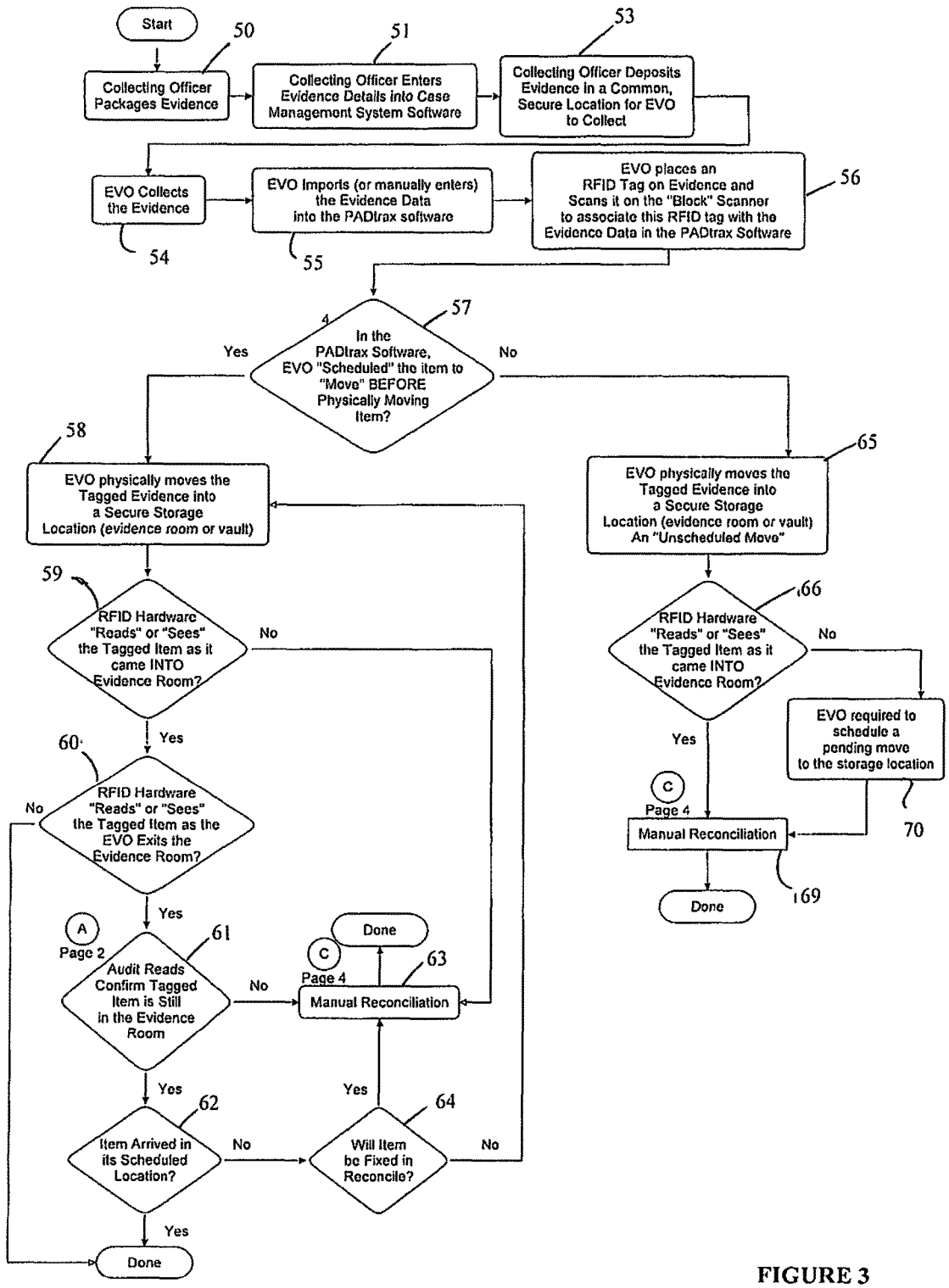
FIG. 3 is a flow-chart illustrating one embodiment for in-processing an item to be stored in the secure enclosure.

FIG. 3 illustrates one embodiment of a methodology which may be used to track whether an object has been moved to a secure location. As a nonlimiting example, the methodology is described in terms of a law enforcement evidence officer handling a piece of evidence. It will be understood that some steps of the methodology may be performed by an individual (e.g., the evidence officer) while other steps are being performed by the system hardware and software. In FIG. 3, steps 50 to 52 suggest how an individual (e.g., a "collecting officer") will package the evidence, enter the evidence details into a case management software, and deposit the evidence in a secure location for another officer to collect (the evidence officer or "EVO" in this example). The EVO collects the evidence (step 54), imports the evidence data (entered by the collecting officer) into the system software (step 55), and places an RFID tag (typically with an adhesive backing) on the bag or container holding the evidence. The user interface software may either be the PADtrax client software or third party evidence entry software from which PADtrax imports the evidence data. Step 56 indicates how the EVO "scans" the RFID tag with the near field reader 14, thereby "associating" the RFID tag with the previously entered evidence data for that item of evidence. This associating of the RFID tag with an item of evidence within the system may also sometimes be referred to as "marrying" the tag to the item of evidence. When discussing how the system handles an item of evidence previously associated with an RFID tag, the following disclosure sometimes uses the terms "item" (of evidence) and (RFID) "tag" interchangeably, since the two are identical in terms of system logic. Where this description uses the term "list," it is generally referring to memory objects stored in temporary memory. Where the description uses the term "table," it is generally referring to database objects stored in longer term memory. In most embodiments, the RFID tags are "passive," i.e., the tags do not have their own power source such as onboard batteries. However, there could be embodiments which use "active" RFID tags or "battery assisted passive" RFID tags.

In step 57, the system software inquires whether the EVO "scheduled" the item for movement or transfer from an existing location, for example, either to move the item into the evidence room (sometimes referred to as "pended-in"), move the item out of the evidence room (sometimes referred to as "pended-out"), or transfer the evidence item between two secure rooms monitored by the system. In many embodiments, "moving" evidence in or out is intended to describe movement of the item between the EVO's station and the evidence room, or between different evidence rooms in the same facility. "Checking" evidence in or out is intended to describe the evidence is leaving the EVO's custody (e.g., a district attorney checking evidence out for use in a court hearing). In one embodiment, scheduling an item for movement involves the EVO using the software interface to notify the system of the anticipated movement. The EVO then physically moves the item into the evidence room (step 58).

As the EVO enters the evidence room, the system receives information from multiple sensors and executes several actions. The system receives an indication that the door was opened from door sensor 22 and if the entranceway entry/exit sensors 20 are crossed, which sensor was crossed first, and thus whether the evidence room was entered or exited. Furthermore, passing of sensors 20 (or alternatively activating of door sensor 22) causes the system to activate RFID reader 16. In effect, the RFID reader is activated as the EVO passes the entranceway upon entry, providing the best opportunity to read any tags being carried by the officer (sometimes referred to as an "entrance read" or "A read"). In addition to activating the RFID reader upon entry into the evidence room, the RFID reader is also activated as the EVO exits through the entranceway as determined by the door sensor and/or the entranceway entry/exit sensor (sometimes referred to as an "exit read" or "B read"). For example, if the EVO entered the room and left the door open, the exit read would be triggered by the EVO crossing the entry/exit sensors 20 on the EVO's departure from the room. In some embodiments, the read session by the RFID reader may also be triggered by the door sensor alone being activated even where the entry/exit sensors are not tripped.

In step 59, the system determines whether the RFID tag scheduled to be moved into the evidence room is "seen" or detected by the RFID reader 16 during the entrance read. If the RFID tag is seen, then in step 60, the system determines whether the particular RFID tag was seen upon the EVO exiting through the entranceway, i.e., on the exit read. If the RFID tag is not seen during the exit read in step 60 (and the door closes), the system returns that the item of evidence associated with the RFID tag is in the evidence room as scheduled. If in step 60, the RFID tag is again detected on the exit read (and the door closes), the system proceeds to step 61 in an attempt to confirm whether the RFID tag is still in the room. It should be understood that simply because the RFID tag was seen on the exit read, that does not necessarily mean the RFID tag is not in the evidence room. Many possible factors (e.g., structure and shape of evidence room, location of RFID tag in room, RF wave reflective materials in the room, etc.) could result in the RFID tag being detected on the exit read even though the tag is stationary and in the room. In step 61, the system performs a series of "audit reads" to determine whether the item is still in the evidence room. In general, an audit read is the activation of the RFID reader under conditions where the evidence room door is closed and it is presumed no individual is in the evidence room. If the RFID tag is detected on the audit read or some selected number of audit reads (e.g., two out of three audit reads), then the RFID tag is presumed to be in the room. In step 62, the system checks whether the room in which the RFID tag is located is in fact the room into which the tagged item was scheduled to be moved (e.g., in the case of the system operating in an environment containing multiple evidence rooms). If step 62 is affirmative, then the routine is complete. If step 62 is negative, then in step 64 the system prompts the user to take action regarding whether the evidence has been scheduled to the incorrect evidence room. For example, the system may prompt the user to physically move the item into the intended room; or prompt the user to re-designate in the system the intended location, from the room the item is currently scheduled to be in, to the room the item is actually in. If the user takes neither of these actions, the system maintains the item on an "unreconciled" list. If the item with the target RFID tag was scheduled to the wrong evidence room, then the system proceeds to a manual reconciliation (step 63). It should also be noted that in step 59, if the RFID tag was not seen upon the EVO entering the room (i.e., during a scheduled move of the evidence item), then manual reconciliation step 63 is likewise the result. The manual reconciliation process is explained further below.

Figure 4:
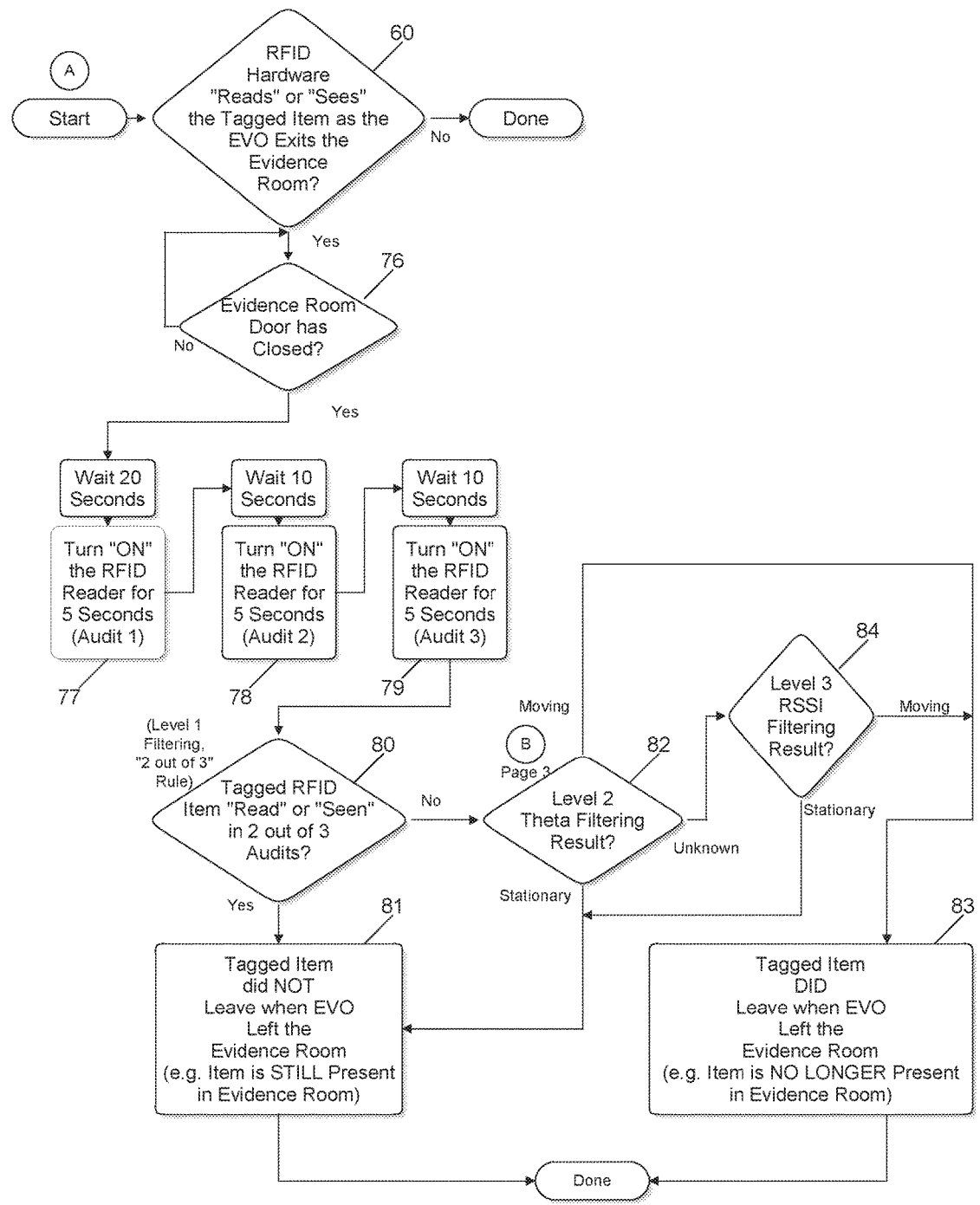
FIG. 4 is a flow-chart illustrating one embodiment of determining whether an item is in the secured enclosure.

One specific embodiment of the audit procedure referenced in step 61 is shown by the flow chart of FIG. 4.

Beginning with the previously described step 60, if the target RFID tag is detected in the exit read, step 76 loops until the system can confirm the door is closed as determined by door sensor 22. Once the door is closed, the system delays 20 seconds and makes the first "audit read." The system delays another 10 seconds and makes a second audit read, and finally after a further 10 seconds, makes a third audit read (steps 77, 78, and 79). In the illustrated embodiment, the delays and multiple reads are intended to give the EVO time to clear the area outside the door and reduce the chances of any items with RFID tags being carried by the EVO being detected and complicating the system's evaluation. Of course, alternate embodiments could vary the time between audit reads, or use fewer (two or even one) audit reads or more than three audit reads. There may be embodiments where audit reads are completely eliminated.

In step 80, the system determines whether the target RFID tag was detected on two of the three audits. If yes, the system in step 81 returns that the RFID tag is present in the room and it is presumed that the exit reading occurred merely because the RFID tag was within the reading range of the RFID reader's antennas, not because the EVO was actually carrying the RFID tag out of the room. The preceding processing is sometimes referred to as "level 1 filtering."

Figure 5A:
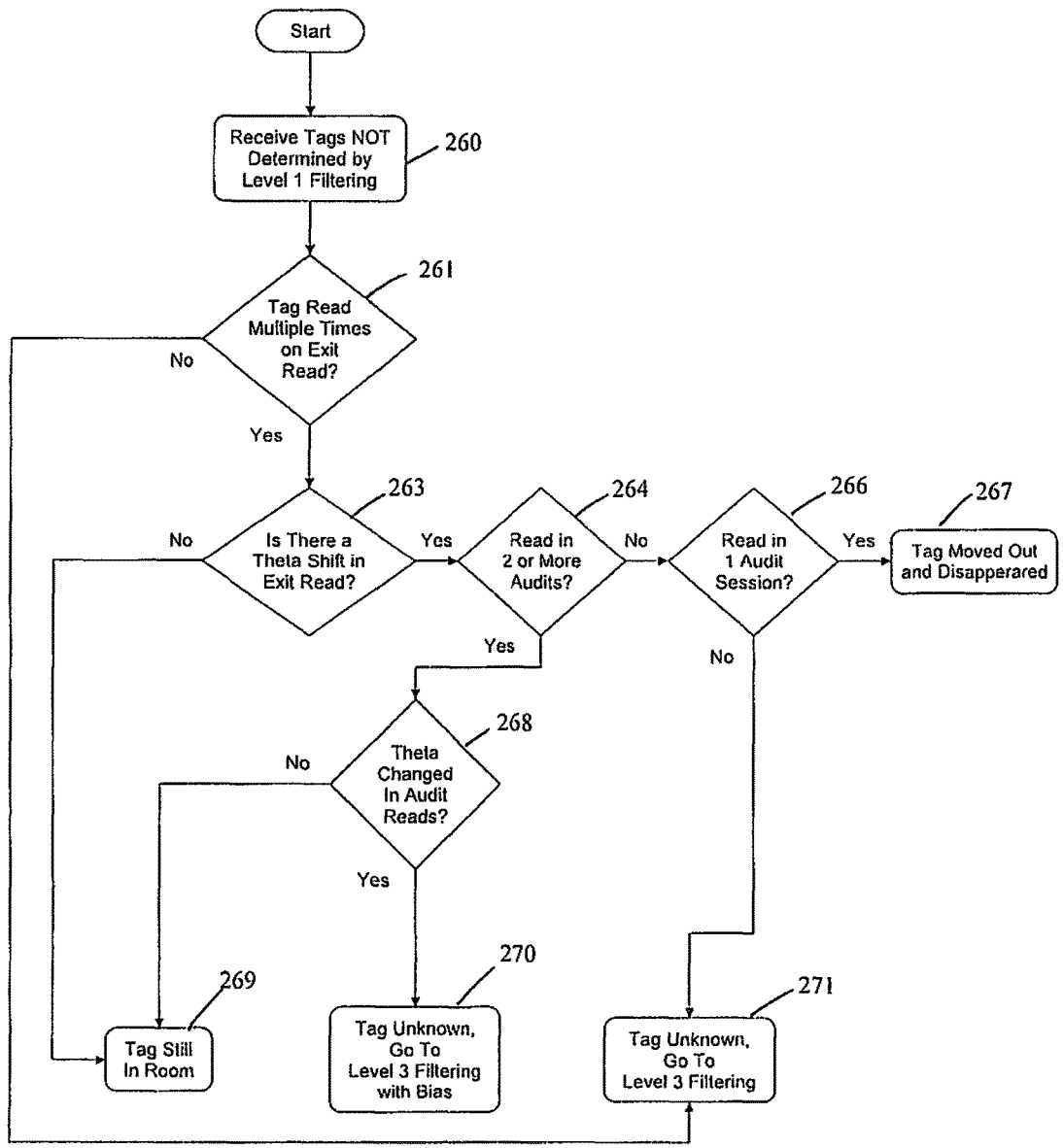
FIG. 5A is a flow-chart illustrating one embodiment of enhanced filtering to determine whether an item is in a secured enclosure.

If step 80 does not detect the target RFID tag in at least two of three audit reads, the system executes a further evaluation procedure referred to as "level 2 filtering" as suggested in step 82 and shown in more detail in FIG. 5A. The goal of such additional "filtering" is to more reliably determine the status (i.e., in or out of the secured area) of RFID tags whose status cannot be confirmed by level 1 filtering alone. One indication of this tag status is whether the tag changes its physical orientation relative to the antenna (i.e., when the tag is in motion). When the tag changes its orientation relative to the antenna, there is typically a change in the phase of the signal reflected from the tag. Thus, whether a tag is in motion can be indicated (inferred by calculation) by whether there are changes in the phase angle of the signal being reflected from the tag. Apart from any phase shift caused by tag motion/orientation, a perceived change in phase angle can be induced by other factors such as disturbances and external influences within the RF field (e.g., individuals moving within or doors opening/closing within the RF field) or noise in the system hardware. The disturbances and external influences in the RF field where an RFID tag is NOT moving may be significant enough to influence Theta to appear as though a tag is actually moving. Similarly, inherent noise from the system hardware (e.g., arising from tolerances in manufacturing process, component differences in the RF electronics, imperfections in RFID tags, etc.) can result in a perceived phase shift of about 4° or 5°, even through there has been no actual change in tag orientation or any perceptible external influence in the RF field. Likewise, as explained in more detail below, shifts in the interrogating wave frequency can result in a perceived phase shift. As used herein, "effective phase shift" means a phase shift determination which takes into account these factors such that the phase shift likely results from an actual change in orientation rather than the nonorientation factors discussed above. Many conventional RFID readers have the ability to determine a shift in phase angle between the carrier constant wave (CW) and the modulated response from the RFID tag. This phase angle (often referred to as "theta" in this disclosure) is reported back as a numeric value. As a nonlimiting example, one brand of RFID reader (Alien 9900+) reports theta within a numeric range of 0-180 (degrees).

As seen in FIG. 5A, the level 2 filtering begins with step 260 receiving those tags which have not been reconciled (i.e. whose status has not been determined) by the level 1 filtering. Step 261 determines whether a tag (the current target RFID tag) is detected (read) multiple times during the exit reading. If the tag is not detected multiple times, it is unlikely further useful information can be obtained utilizing theta and the system proceeds to step 271 where the tag location is temporarily determined to be unknown. On the other hand, if the tag is detected multiple times, step 263 inquires as to whether there has been any phase shift between the different individual reads in the exit reading. If there has been no phase shift between individual reads during the exit reading, the tag is determined to be in the evidence room in step 269. If a phase shift between reads is found in step 263, step 264 queries whether the tag has been read in at least two audit readings. If yes, step 268 queries whether there has been any change in theta over the entire audit cycle (e.g., the three audit readings of the FIG. 4 embodiment). If no change in theta is detected during the audit cycle in step 268, the tag is again determined to be in the evidence room as per step 269. However, if a change in theta is detected in any reading during the audit cycle, then the system determines that the location of the tag is unknown and step 270 indicates another level of filtering should be undertaken ("level 3" filtering discussed below). Returning to step 264, if the tag was not read in at least two audit sessions, then step 266 queries whether the target tag was read in a single audit reading. If the tag was detected in only one audit reading, then step 267 returns that the tag is not in the evidence room. If there is no detection of the tag in step 266, step 271 returns that the location of the tag is unknown and the system again calls for level 3 filtering. Step 270 references "level 3 filtering with bias," meaning that step 270 (as opposed to step 271) enters the level 3 filtering giving greater weight to the possibility that the target RFID tag is still in the secure storage area. Where this disclosure describes the system as determining the "tag is in" the evidence room or that the system "returns an indication that the tag is present in the storage room," etc., it will be understood that this includes not only the determination that the tag is in the stated location the determination, but alternatively, that the tag is merely more likely in the stated location.

It will be understood that each of the entrance readings, exit readings, or audit readings may detect the tag several times (i.e., "read" the tag several times). Additionally, the phase angle is specific to each antenna which detects the tag (e.g., presumably antenna 1 and antenna 2 in an RFID system are somewhat spaced apart such that they will record different phase angles for the same tag at the same moment). Moreover, many reader devices operate using a frequency hopping technique to reduce interference from/with other RF devices. For example, U.S. Federal Communications Commission rules specify that passive, class 1, gen 2 RFID readers will operate between 902 MHz and 928 MHz with frequency hops within this band at least every 400 ms. As suggested above, when a particular RFID tag is read at a first frequency and then read again at a second frequency, there will be a change in theta induce by the frequency change alone (i.e., a change in theta with no change in the physical orientation of the tag). It has been discovered that for a given tag, with other conditions being equal, a given change in frequency results in a generally consistent change in theta. For example, a frequency change of 0.5 MHz results in a theta change of approximately 5°. Thus, a series of tag reads at different frequencies will have their phase angles "normalized" using this approximation such that the system compensates for phase shift due to frequency hopping. Additionally, different readers hop at different frequency sequences. Thus, the normalization procedure takes into account the reader's particular frequency sequence in calculating the normalization. With this normalization, the system may assume any further detected phase shift is due to motion rather than frequency change.

Figure 5B:
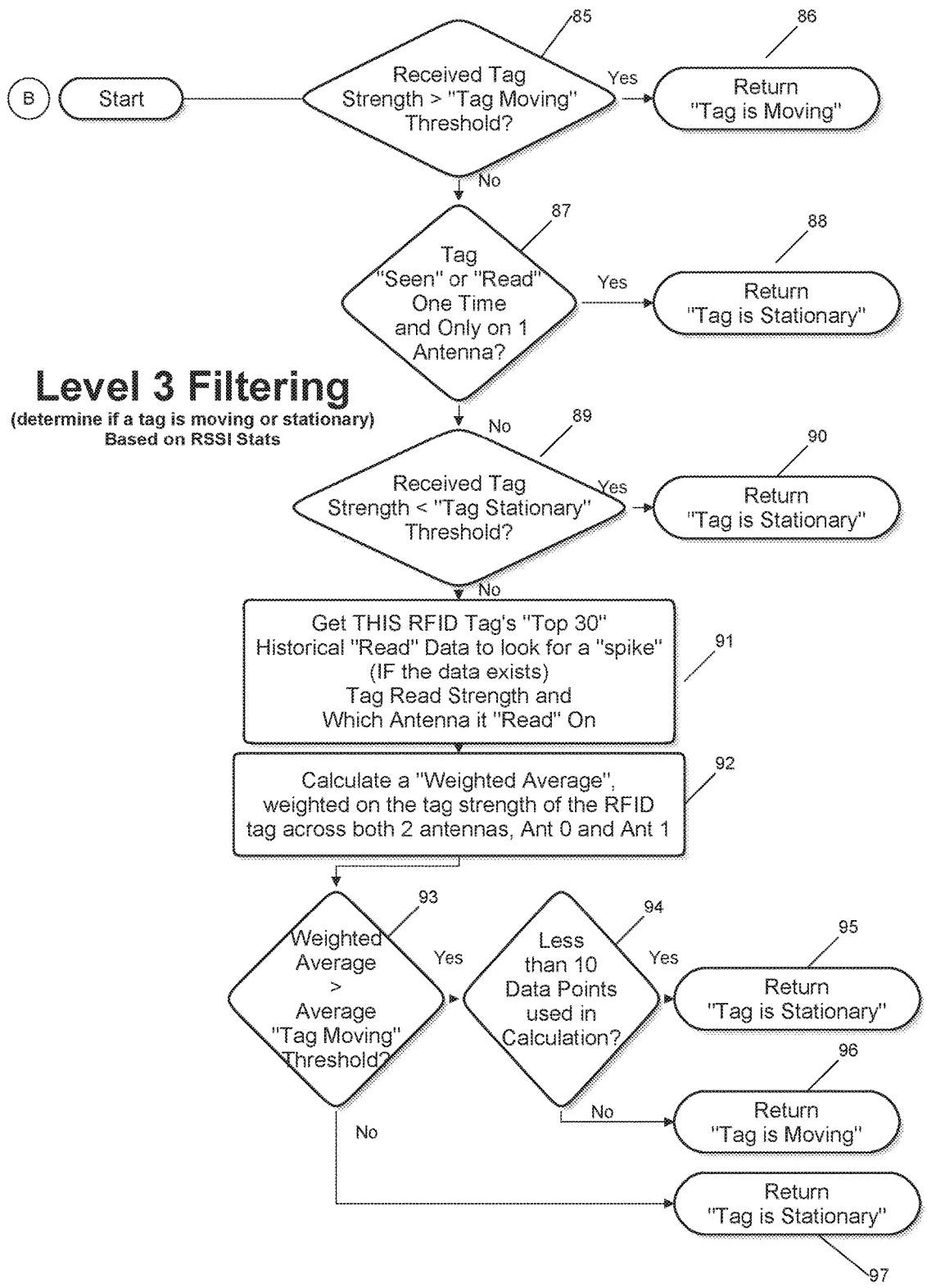
FIG. 5B is a flow-chart illustrating a second embodiment of enhanced filtering to determine whether an item is in a secured enclosure.

As suggested in steps 268 and 270 of FIG. 5A, there is a third level of filtering when shifts in phase angle does not provide sufficient information to determine whether the tag is within the evidence room. The procedure for this "level 3" filtering is shown in FIG. 5B. Step 85 of FIG. 5B begins with determining whether the received "tag strength" is greater than a "tag moving" threshold. It will be understood that when the RFID reader identifies a tag return signal, the reader can also measure the strength of the RFID tag signal, which will sometimes be referred to herein as the Received Signal Strength Indicator or "RSSI." Although different RFID equipment providers specify somewhat different RSSI valuations, for purposes of this disclosure, RSSI will be specified in terms of a unitless number, with approximate examples of a very high RSSI (e.g., the RFID tag very close to the antenna with no interference) of over 4000 and a low RSSI (e.g., the RFID reader barely able to detect the RFID tag) of less than 2500. Additionally, for each detection of an RFID tag, the RFID reader records on which antenna(s) (e.g., 18A and/or 18B in FIG. 1) an RFID tag return signal was received.

The illustrated embodiment of the system will operate with three tag strength thresholds: "Tag Moving," "Tag Stationary," and "Average Tag Moving" (Average Tag Moving being described as a percentage for comparison with the weighted average described below). As one example, the Average Tag Moving magnitude could be found by sampling the tags in a static environment and determining what percentage variation there is in the RSSI for each tag. The Average Tag Moving threshold would be set at a value at or slightly above this percentage variation. Each of these thresholds will be assigned initial values which have been determined empirically. As a non-limiting example, the Tag Moving might be initially set at 4000, the Tag Stationary at 2500, and the Average Tag Moving at 10%. In certain embodiments, these values can be modified by trained technicians as data is collected on RFID signal return characteristics which will be particular to every given location. Other embodiments could include programming logic to automatically adjust these thresholds based on tag read data (over time) and the user's interaction to correct mistakes made by Level 3 Filtering.

Returning to step 85 in FIG. 5B, a determination is made whether the received RFID tag strength is greater than the Tag Moving Threshold. If "yes," the system returns that the tag is moving, if "no," the system proceeds to step 87. In step 87, the system determines whether the tag is detected only one time (i.e., a tag detected only once across all three audits) and if only detected by one antenna. If "yes," the system returns that the tag is stationary and if "no," proceeds to step 89. In step 89, the system determines whether the tag strength is less than the "Tag Stationary" threshold. If "yes," the system returns that the tag is stationary and if "no," proceeds to step 91 and begins a more complex evaluation.

In steps 91 and 92, the system will obtain the target RFID tag's historical strength data and determine an average tag strength (e.g., the weighted average described below used in order to compensate for an outlier RSSI in the tag history). As one example, the system may obtain the target RFID tag's most recent 30 readings (or whatever the number of existing historical readings if less than 30) from the Tag Stream table, collecting the strength of and on which antenna(s) each reading was detected. The system will determine from the 30 most recent readings, for each of the antennas, the MAX tag strength (i.e., of the 30 readings, the one with the highest RSSI), the AVERAGE TAG strength, and the SUM of the tag strengths. With this information, the system will calculate for each antenna a Max Percent Off Average (MPOA)=((MAX−AVERAGE)/SUM)*100. In step 92, the system will calculate the weighted average (WA) of the tag strength as a function of the hit count (HC), which is the number of times each antenna detects the tag within the tag's most recent 30 reads, via the formula:

$$WA=((HC.0 \times MPOA.0)+(HC.1 \times MPOA.1))/(HC.0+HC.1);$$

where HC.0 is the hit count on Ant 0, MPOA.0 is the MPOA on Ant 0, HC.1 is the hit count on Ant 1, and MPOA.1 is the MPOA on Ant 1. Step 93 determines whether the WA is greater than the average Tag Moving Threshold. If "no," the system returns tag is stationary in step 97. If "yes," step 94 determines whether less than 10 data points (e.g., less than 10 historical reads) were used in the calculation of weighted average. If "yes" in step 94, the system returns that the tag is stationary since if the tag is only read 10 times, it is more likely that the tag is stationary than that the tag was actually carried past the reader antennas. If "no" in step 94, the system returns that the tag is moving in step 96. If "yes," step 94 returns that the tag is stationary in step 95.

Returning to step 82 in FIG. 4, the system determines from level 2 and level 3 filtering whether the target RFID tag is moving or stationary. If the RFID tag is deemed stationary, the system returns in step 81 that the RFID tag is in the evidence room. If the RFID tag is deemed moving, the system returns in step 83 that the RFID tag is no longer in the evidence room. Although the illustrated embodiment describes the system performing level 1, level 2, and then level 3 filtering, other embodiments could perform just level 1 and 2 filtering or just level 1 and 3 filtering.

Figure 6:
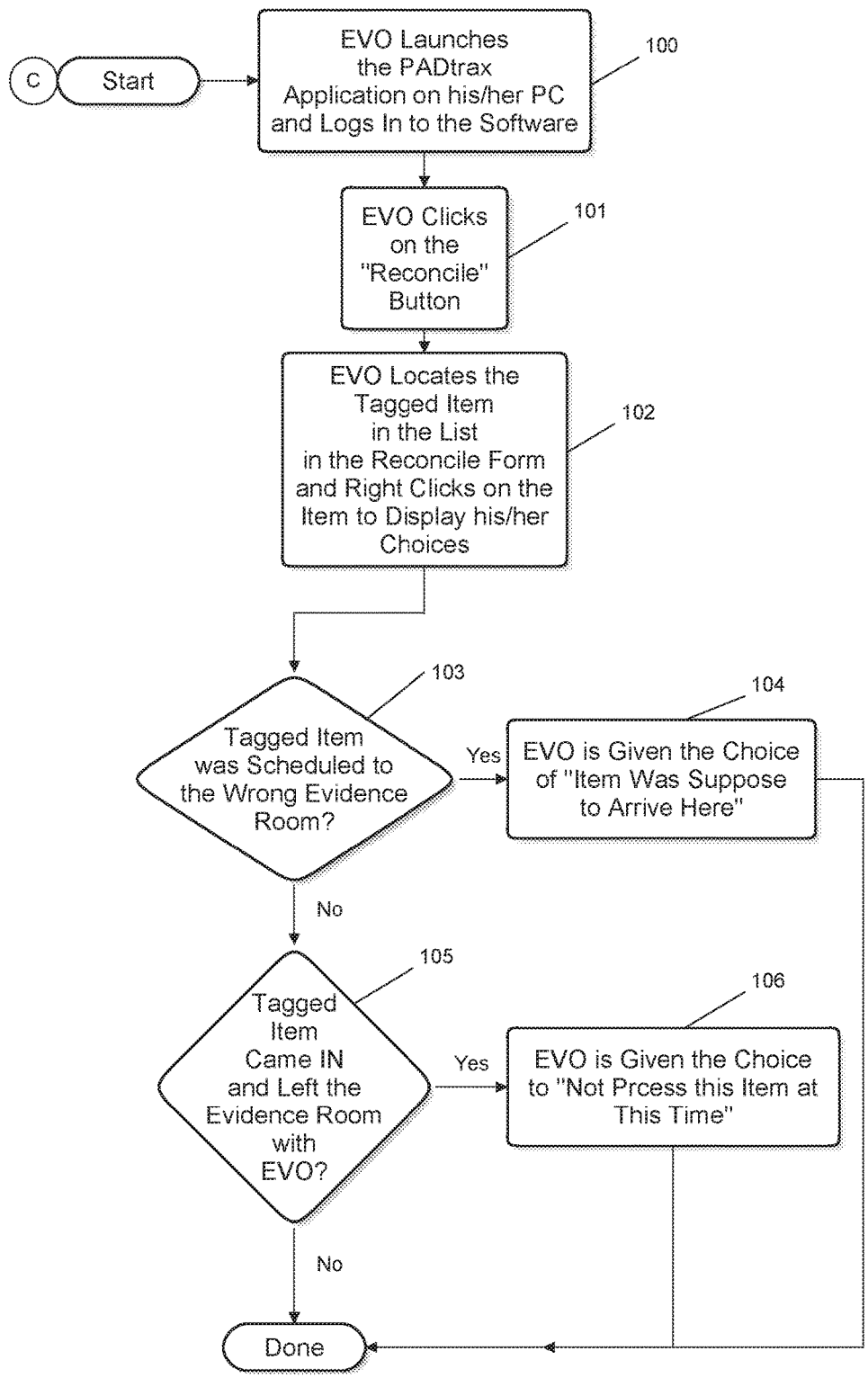
FIG. 6 is a flow-chart illustrating one embodiment of a reconciliation procedure.

As suggested in reference to step 63 of FIG. 3, certain conditions will result in the system requiring a manual reconciliation procedure. One example of such a reconciliation procedure is shown in FIG. 6. In step 100, the user launches the system software and issues a "reconcile" instruction (step 101) which causes the system to present a list of unreconciled items (known as the "reconcile list"). As the user locates items of interest on the reconcile list, the user selects the item for further determination in step 102. The system prompts the user as to whether the item was scheduled to the wrong evidence room in step 103. If "yes," the system gives the EVO the choice of updating the system to indicate the item was intended for transfer to the room where the item currently resides. If "no," step 105 determines whether the item was taken out of the room by the EVO (e.g., seen on an exit read and not seen in 2 of 3 audit reads). If step 105 returns "yes," the EVO is given option to not process item at this time and the item remains on the reconcile list (step 106). Otherwise, the reconcile procedure is complete. If the answers are "no" to both steps 103 and 105, the tag would remain unreconciled. If the EVO wishes to reconcile the unreconciled records (tags), the EVO would do so by moving the tags to the intended room the EVO previously entered into the system.

In FIG. 3 step 57, if the EVO did not schedule the item for a move into the evidence room, and in step 65, the EVO physically moves the item into the evidence room, then in step 66, the reader will execute an entry read. This is considered an "Unscheduled Move". If the reader does not detect and read the tag associated with the item, the client software in step 70 will show the item as being in an unpended state, which notifies the EVO that the item has not been properly scheduled for a move. The EVO will then need to correctly schedule the item for a move in and ultimately go through the manual reconciliation procedure. If in step 66, the system reads the tag on the entry read, then the system proceeds directly to the manual reconcile step 69 as described in more detail in FIG. 6.

Conversely, an item can be moved out of an evidence room without scheduling a "move out". This is also known as an "Unscheduled Move". In this case, the moved item will appear in the reconcile menu of the user interface, prompting the EVO to account for this "move out". This is accommodated by the PADtrax software displaying a tailored list of choices based on both the direction (in this case, the item was moved "out") AND the fact that the item was NOT scheduled to be moved out. If the item was intended to be "moved out", one of the choices provided to the EVO will be: "Moved out—I did not schedule a pending move . . . ". However, if the item did NOT actually "move out" AND is still in the evidence room, this is simply considered an "Erroneous (Stray) Read". In this case, the EVO would choose: "Erroneous read—Item remains in last known location."

Figure 7:
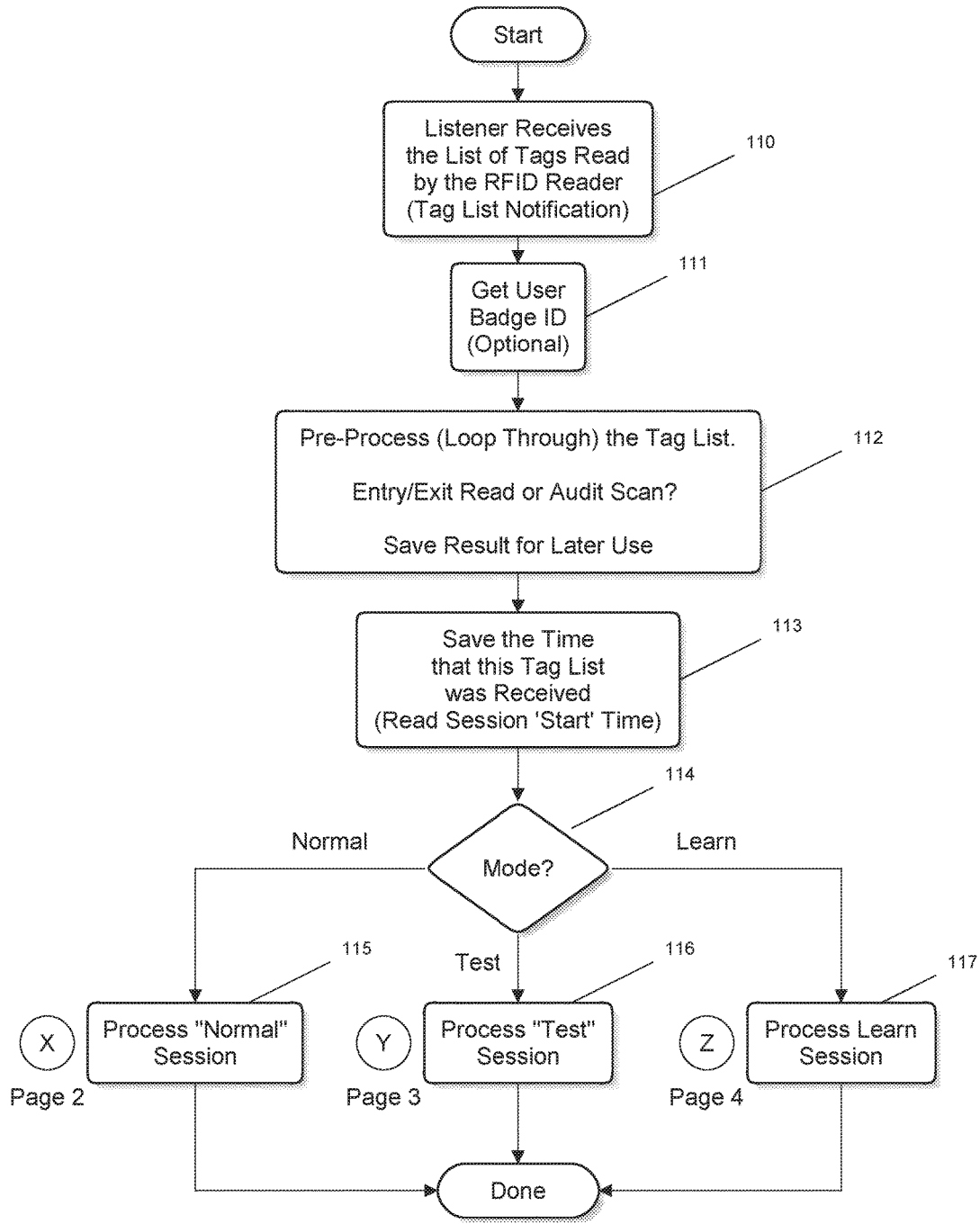
FIG. 7 is a flow-chart illustrating one embodiment of processing a reader tag message.

FIGS. 3-6 illustrate a more general overview of the system's functionality. A more specific description of various system processing tasks are illustrated in FIGS. 7 to 14. FIG. 7 suggests one example of how the system processes a "read session," i.e., the activation of RFID Reader 16 for a given period (e.g., five seconds) and the collecting of reflected RFID tag signals which the RFID reader can identify as tag data. In step 110, the "Listener" software component receives a "Tag Notify" list of RFID tags from Reader 16. As used herein, "Tag Notify" means a list of the unique tags detected by the reader on each antenna. In other words, the Tag Notify list only contains a single occurrence of each RFID tag read. This will be distinguished from a "Tag Stream" list which contains every instance of detecting an RFID tag on a particular antenna during a read session, which typically results in the same tag appearing numerous times on the list. In step 111, if the EVO is wearing an RFID personal identification badge, the system also obtains the officer identification information.

Figure 8A:
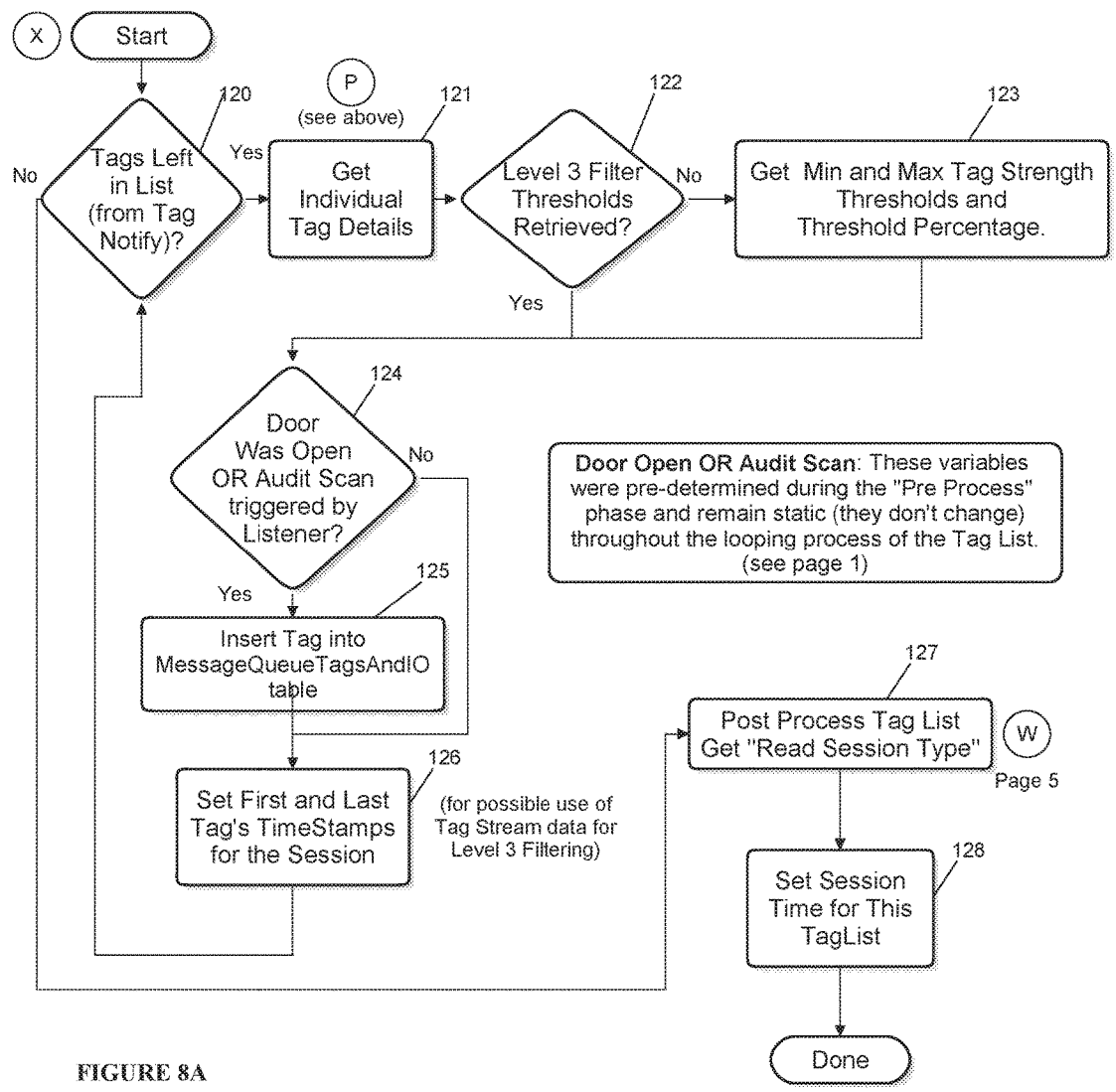
FIG. 8A is a flow-chart illustrating one embodiment of processing a "normal" read session.

In step 112, the Tag Notify list is pre-processed which includes extracting information on whether the tag was received during an entry, exit, or audit reading and whether any event interrupted the normal course of the read session (e.g., the door opening or the entry/exit sensor triggering during an audit reading). In step 113, the system logs the start time of the read session. Then in step 114, the system determines whether the session is a normal read session (step 115) or whether the user has instituted a "test" session (step 116) or a "learn" session (step 117), the latter two of which are described further below. If the session is a normal read session, FIG. 8A shows one example of a procedure the system could follow. While there are unprocessed tags from the Tag Notify list, for each tag, the system in step 121 will associate with that tag certain tag details. In one embodiment, those tag details may include 1) MAC Address of the RFID Reader (to identify which reader, if more than one, "reads" the tag); 2) the Antenna on which the RFID tag was read (e.g., 0 or 1); 3) the RFID Number; 4) the date and time that the RFID reader read the RFID tag; 5) a decimal number that represents the state of the Input Sensors (e.g., the door sensor, the entry/exit sensor); 6) the MAX RSSI of the RFID tag (e.g., the maximum read RSSI of that tag within that session); 7) the Count of how many times the RFID tag was read in this "session;" 8) Theta (the angle at which the reader's antenna read the RFID tag); and 9) the RF frequency at which the RFID tag was read. Obviously, these details are non-limiting examples and other embodiments could include more, fewer, or other tag details.

Step 122 inquires whether the level 3 filter variables (e.g., Tag Moving, Tag Stationary, Average Tag Moving as discussed above in reference to FIG. 5B) have been retrieved. Typically, the system will retrieve these variables when the first tag is processed and step 122 will respond "yes" for all following tags. Step 123 will retrieve these previously set variables when the first tag is processed. In step 124, the system uses the previously obtained values (step 112, FIG. 7) to determine whether the read session is associated with an entry/exit read or an audit read. If "yes," step 125 inserts the tag in a list or table referenced for purposes of this description as the "MessageQueueTagsAndIO" table. This table is a temporary holding location to assist in capturing all tags read by the RFID Reader. As the system logic is applied, this table will be filled and emptied throughout an entire read cycle. However, until the tags are deleted, the MessageQueueTagsAndIO table serves as the source of tags for the system logic and filters to act upon. In step 126, the system determines the time stamp for the first and last tags read and sets those times as the session start and finish times of the Tag Stream table. When no tags are left in the Tag Notify list, step 127 post-processes (see FIG. 9) the Tag Notify list and finally step 128 sets the session time for the MessageQueueTagsAndIO table.

Figure 9:
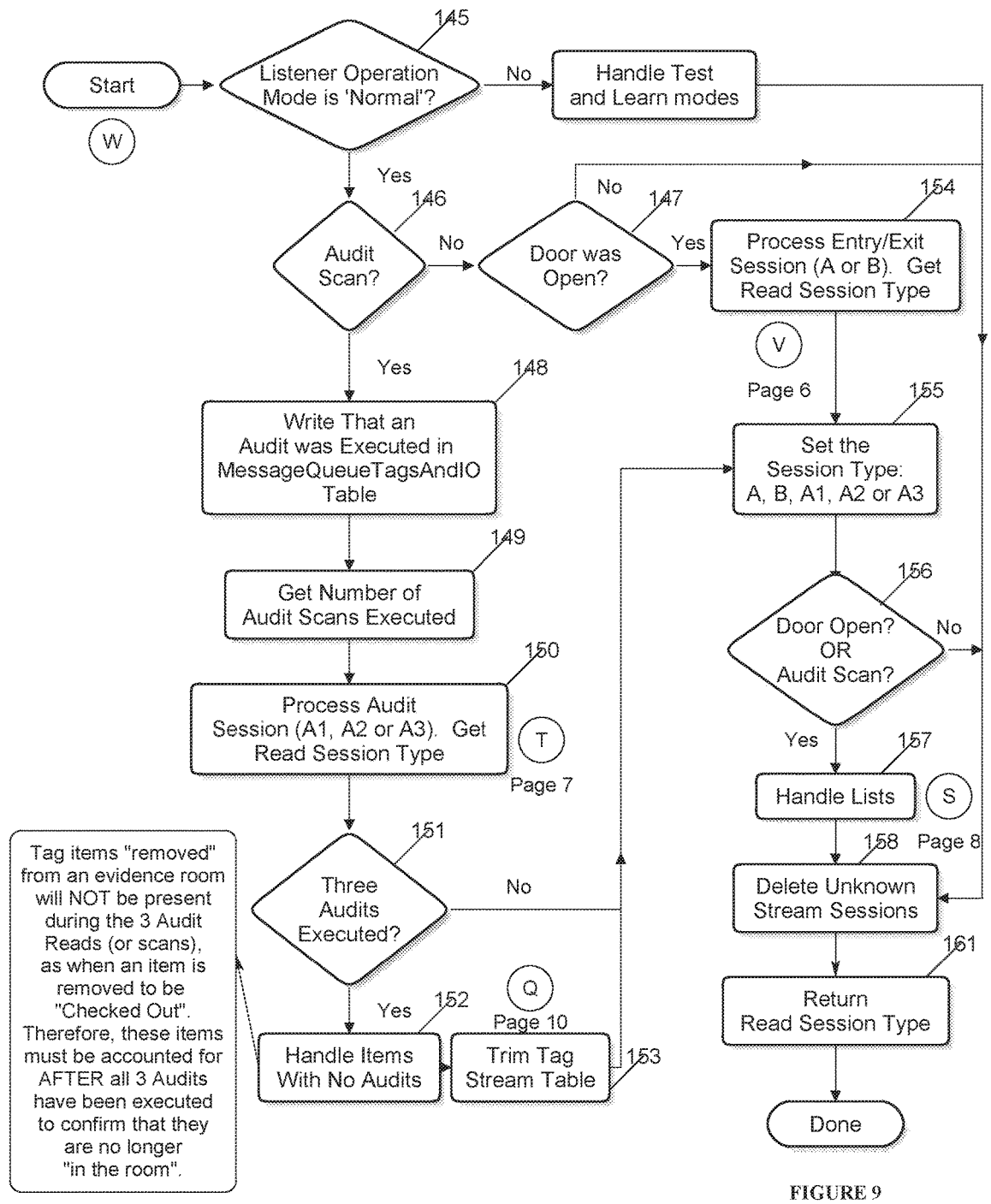
FIG. 9 is a flow-chart illustrating one embodiment of post processing a reader tag message.

FIG. 9 illustrates the post processing function of FIG. 8A's step 127. In step 145 of FIG. 9, the system determines whether the read session was "normal" vs. a "test" or "learn" session. If the session was not a normal session, step 162 presumes the session was a "test" or "learn" session and the session is deleted (step 158) since such data is not intended to become part of the "live record." If the session is "normal" in step 145, step 146 determines whether the session was an audit session. If an audit session, step 148 marks the record as an audit scan and saves it to the MessageQueueTagsAndIO table, while step 149 determines which audit scan the tag list corresponds to (e.g., first, second, or third audit scan which may be represented by A1, A2, and A3). In step 150, the audit session then being processed (i.e., A1, A2, or A3) is subject to the procedure in FIG. 11.

Figure 11:
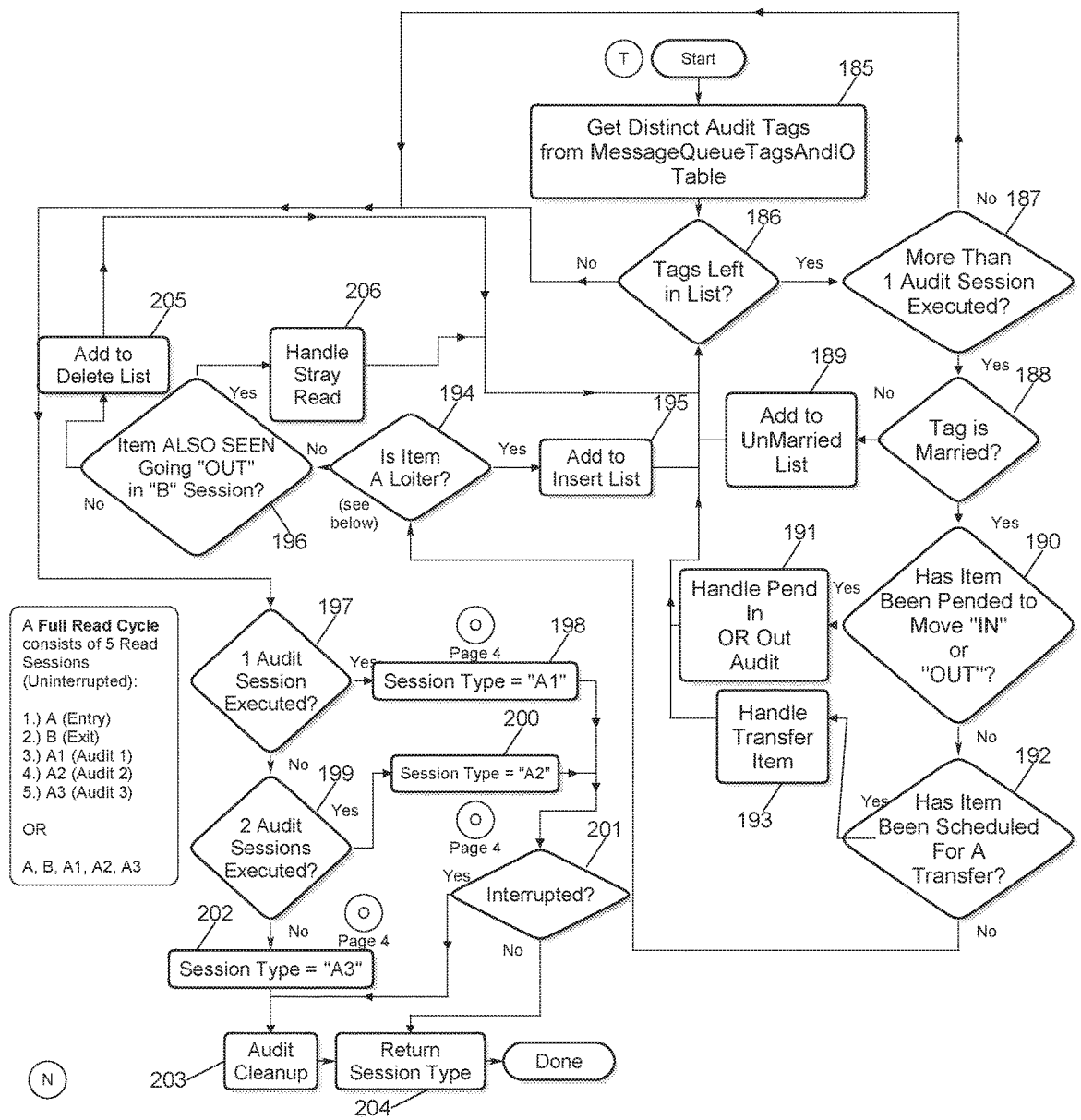
FIG. 11 is a flow-chart illustrating one embodiment of processing an audit session.
Figure 12:
FIG. 12 is a flow-chart illustrating one embodiment of processing lists in memory.

In FIG. 11, the procedure begins with step 185 iteratively retrieving the "distinct" audit tags from the MessageQueueTagsAndIO table. These tags are distinct in the sense that a tag is retrieved only once regardless of how many audit sessions in which it was read. While tags are left in the list, step 187 will query whether more than one audit session was executed. It will be understood that if only one audit session has been executed, no decision can be reached regarding the status of the tag (e.g., the tag cannot be deemed "present" based upon 2 of 3 audit reads). If step 187 is "no," the system executes steps 197 to 202 which identifies the audit sessions as A1, A2, or A3. Step 201 checks whether any one of the audit sessions was interrupted (e.g., a person opens the evidence room door during an audit session). If an interruption occurs, the system proceeds to step 203 where all audit session are deleted (audit cleanup) and the series of audit sessions re-starts the next time the EVO exits the room as determined by the entry/exit sensors and when the door closes, as determined by the door sensor. Step 204 will return the session type, i.e., A, A1, A2, A3, or "Unknown" in case of an interrupt. For all proper (uninterrupted) audit sessions, the appropriate reads will be saved to the appropriate list (e.g., Unmarried, Insert, or Delete) prior to the session being deleted in the audit cleanup step.

Returning to step 187, if more than one audit session has been executed, the system determines in step 188 whether the tag is married, i.e., has the EVO previously associated within the system the RFID tag to an item of evidence. If "no," step 189 adds the tag to the unmarried list and proceeds to step 186. If step 188 is "yes," step 190 queries whether the item has been pended for move-in or move-out. If "yes," the tag is handled as a Pended-In or Pended-Out Audit in step 191 (e.g., if the item was seen as a result of level 1 to level 3 filtering, the tag is added to the Insert List as "IN" the room; if the tag is not seen upon level 1 to level 3 filtering, it is not added to the Insert List and is left for reconciliation). If the item has not been pended for moving in or out, step 192 queries whether the item has been scheduled for a transfer. If "yes," step 193 handles transfer of the item, i.e., the transfer is treated as a series of Pend Out(s) and Pend In(s) as the item is moved from its original room to its new room. If step 192 is negative, then step 194 queries whether the item is a "Loiter." An Item is considered to be a "Loiter" if it is "read" in ANY session, after it has been "checked out" to a custodian for taking "off site." This can occur if the custodian walks near the doorway to an evidence room while the RFID Reader has been triggered (either by the EVO walking in or out, or by the Listener executing an Audit). Loiters are recorded, but have little value in a read cycle as they have become the responsibility of the custodian, i.e., the system would generally not be expected to track such items. If the item is a Loiter, it is added to the Insert List in step 195. The "Insert List" is a list of tags to eventually be placed in an Evidence Data table to record the last known (or "seen") location of a tag. It should be understood that the Evidence Data table will contain all of the last known information that describes the evidence and the tag. If the item does not qualify as a Loiter, step 196 queries whether the item was seen going out in a "B" session (or an exit read). If "no," step 205 adds the item to a Delete List. The Delete List contains tags which do not need to be processed, i.e., these tags are ignored and scheduled ultimately to be removed from the MessageQueueTagsAndIO table. If in step 196, the response is "yes," step 206 functions to handle a "Stray Read." A Stray Read occurs when a tag is read while the EVO is exiting an evidence room, but the item did NOT exit the room with the EVO. Stray Reads require the Audits and Level 1 and 2 Filtering to confirm their whereabouts (either "IN" the evidence room or NOT).

Returning to FIG. 9 and step 150, after processing of an audit session, step 151 inquires whether three audits have been executed, if not, step 155 sets the particular audit session as either A1, A2, or A3. If three audits have been completed in step 151, in step 152 the system handles any items with no audits (e.g., tags read on A or B reads, but not read on any audit reads). For example, tag items "removed" from an evidence room will NOT be present during the 3 Audit Reads (or scans), as when an item is removed to be "Moved Out". Therefore, these items must be accounted for AFTER all 3 Audits have been executed to confirm that they are no longer "in the room". If the item was read on an A session, but not on a B session (and not seen in any audits), the system considers the item to be in the room. If the item was read on a B session (regardless of being read on A session and not seen on any audits), the system considers the item to have left the room. In both cases, the item is added to the Insert List with the appropriate indicator of having been moved in or out. In step 153, the system will trim the Tag Stream table as suggested in FIG. 14.

Figure 14:
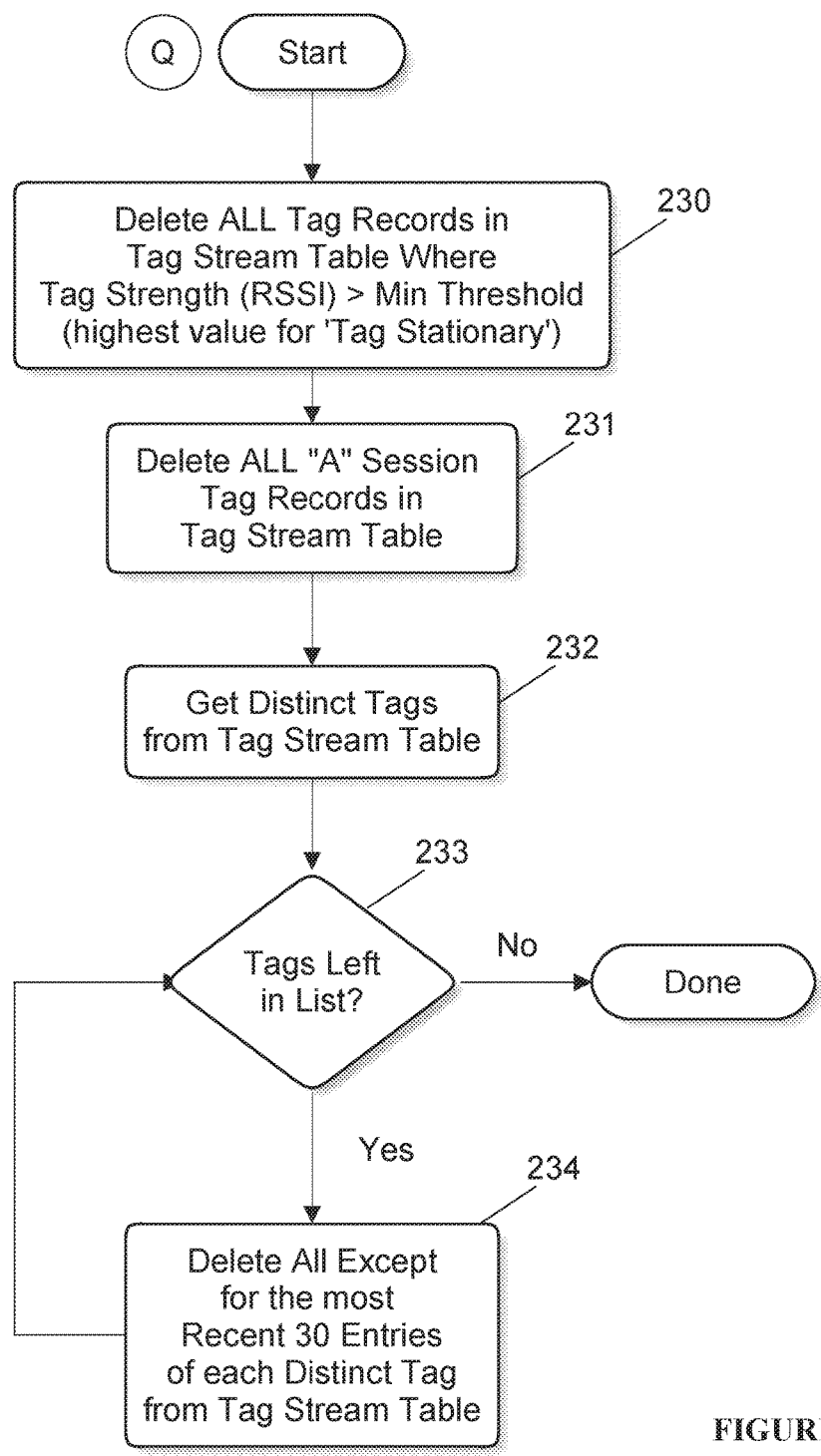
FIG. 14 is a flow-chart illustrating one embodiment of a tag table trimming procedure.

Beginning with step 230 in FIG. 14, the system deletes all records (of tags) in the Tag Stream table if the RSSI of that tag is greater than a minimum threshold in order to eliminate reads of tags likely to be moving (i.e., the system is attempting to build a history of stationary tag RF characteristics). In one embodiment, this minimum threshold is set to the Tag Stationary threshold described above. In step 231, the system deletes all "A" or entry session tag records from the Tag Stream table since these tags are more likely to represent items moving into the room and are less likely to represent items stationary in the room. In step 232, the system retrieves all distinct tags from the Tag Stream table, i.e., creates a list of tags with no redundancy of tags. Finally, steps 233 and 234 operate to maintain a list of only the 30 most recent entries of each distinct tag and deletes the oldest entries for each distinct tag from the Tag Stream table.

Returning to FIG. 9, for the next tag message which is not an audit read, step 147 queries whether the door was opened. If "no," the session is an unknown type and is deleted in step 158. One example of an unknown session occurs when close movement to the entry/exit sensor triggers a read, but the door is not opened. If the door was open in step 147, step 154 treats the read session as an entry or exit read and processes the session in accordance with FIG. 10. In step 165 of FIG. 10, the system retrieves all tags from the MessageQueueTagsAndIO table which have been identified as read during an entry or exit read. While tags are left in the table, step 166 iteratively calls step 169 which retrieves the individual tag details such as described above in regards to step 121, FIG. 8A. Step 170 determines whether the tag was seen on an entry read, in which case step 171 labels the tag as an "A" type session or an entry session. If the tag was not an entry read, but was an exit read as determined in step 172, the tag is labeled as a "B" type session or an exit session in step 173. If the tag qualifies as neither type "A" or type "B," step 174 labels the tag as being from an unknown session type. Step 175 queries whether the tag is married. If "no," the tag is added to an unmarried list. The unmarried list is generated to provide the user with notice that tags not associated with a known item of evidence have been seen by the system. If the tag is married, step 177 next handles any sessions from other RFID readers (if such readers exist) during the transfer. In other words, if item "X" is read on an RFID reader from another room (room 1), BEFORE a full audit process has confirmed that item "X" "left" its previous location (evidence room 1), the simple fact that it is "seen" on another reader for room 2 tends to verify that item "X" did in fact "leave" room 1, thereby confirming that the item did actually move out of room 1 as a result of being "read" by the RFID reader associated with room 2.

In step 178, the system queries whether the item has been pended for moving into or out of the evidence room. If yes, step 179 queries whether the item was pended in. If "yes," the item is added to the Insert List in step 180. If in step 178, the item has not been pended in or out, step 181 queries whether the item has been scheduled for a transfer. If "no," step 183 queries whether the item is a Loiter and if "yes," adds the item to the Insert List in step 180. When no further tags are left in the list per step 166, step 167 calls a "pend-in express" procedure illustrated in FIG. 13.

Figure 13:
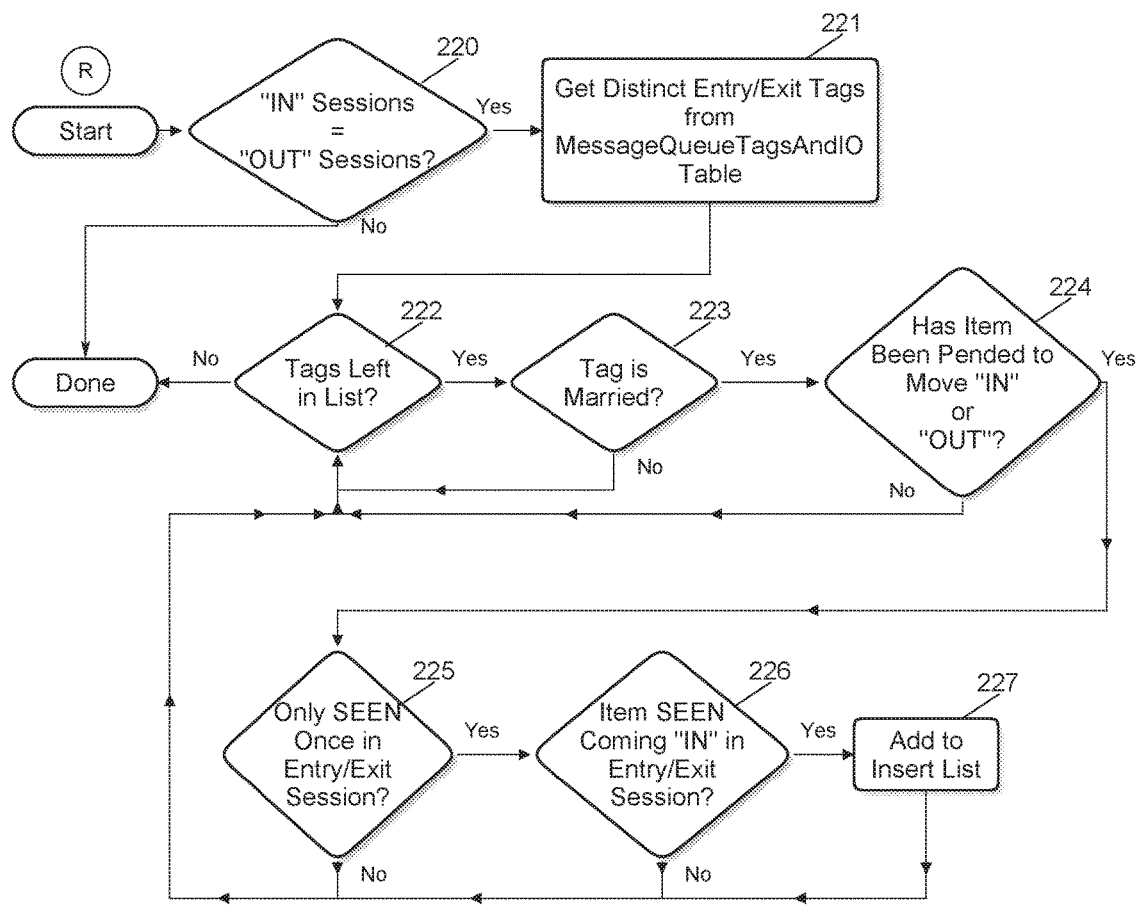
FIG. 13 is a flow-chart illustrating one embodiment of an abbreviated tag move-in procedure.

In FIG. 13, step 220 queries whether the number of "in" read sessions equals the number of "out" read sessions. If "no," then the routine ends. In other words, the routine only proceeds in the typical situation where the number of times the EVO entered the room is equal to the number of times the EVO exited the room. If this condition is not met, the system assumes a person is still in the room. If the condition of step 220 is fulfilled, then step 221 retrieves the distinct entry/exit tags from the MessageQueueTagsAndIO table. While tags remain in this list (step 222), step 223 will query whether the tag is married. If "yes," step 224 queries whether the item has been pended for move in or out. If "yes," step 225 asks whether the tag was seen only once in an entry/exit session. If in step 226, the tag was read coming in during an entry/exit session, then the tag is added to the insert list in step 227. A negative response in any of steps 223, 224, 225, or 226 returns to step 222 (without insertion of the current tag into the Insert List) for sampling of the next tag. In reference to step 225, it should be understood that this embodiment of the system treats the EVO walking "IN" to the room and then walking "OUT" of the room as two separate Entry/Exit sessions. Thus, if the tag is read "twice", this means that that tag was read both on the "IN" session (A) and the "OUT" session (B). In the FIG. 13 embodiment, this condition fails the Pend-IN Express procedure and the item will now need to be handled by the audit procedure to confirm its location (e.g., return to step 185 in FIG. 11). Returning to FIG. 10, step 168, the system returns the session type (e.g., retrieves the session type determined in steps 171 and 173 of FIG. 10).

Figure 10:
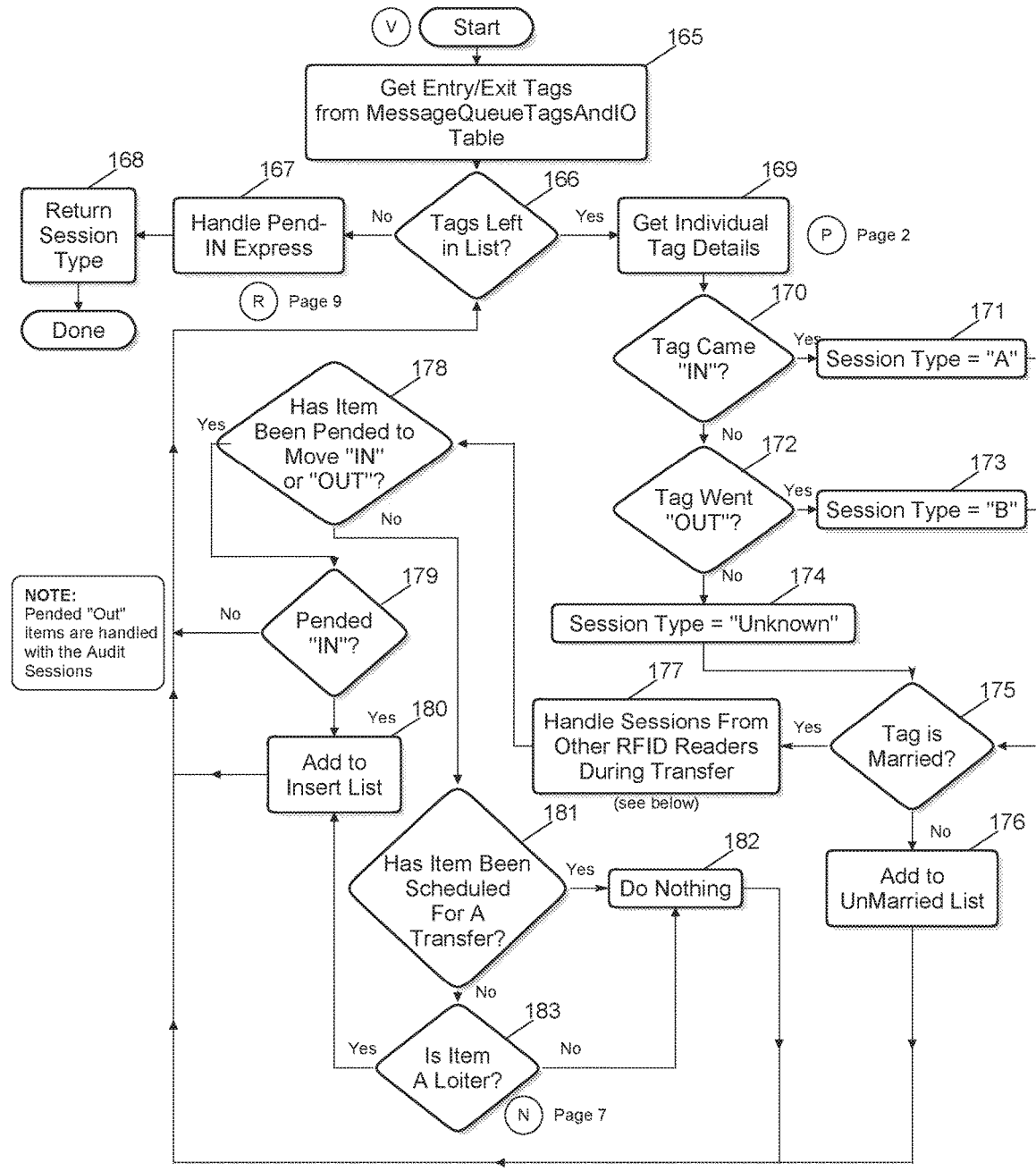
FIG. 10 is a flow-chart illustrating one embodiment of processing an entry/exit session.

The procedure of FIG. 10 has been represented by step 154 in FIG. 9. Viewing step 155 in FIG. 9, the system sets each session as either an entry, exit, or audit type. In step 156, the system queries whether the session arose from a door opening or an audit read. If neither the door was opened, nor is the read an audit type, then the system moves to step 158. If the read was either audit based or because of the door opening, step 157 handles the list according to the procedure shown in FIG. 12. Beginning with step 210 in FIG. 12, the system saves tags in the unmarried list in temporary memory to an unmarried table in the database. Ultimately, the system will notify the user of any unmarried tags and the details associated with those tags. Step 211 deletes tags in the unmarried list from the MessageQueueTagsAndIO table and step 212 deletes tags in the delete list from the MessageQueueTagsAndIO table. Next, step 213 saves tags from the Insert List to an EvidenceData table. In step 214, the Insert List tags are deleted from the MessageQueueTagsAndIO table. In step 215, each of the Umarried List, Delete List, and reset list are reset (i.e., cleared). Finally, step 216 updates the tag stream session and type, i.e., in the Tag Stream table, this step labels the type of session in which this tag was read.

Returning to step 158 in FIG. 9, the system deletes any unknown session streams and then returns the read session type in step 161.

Figure 8B:
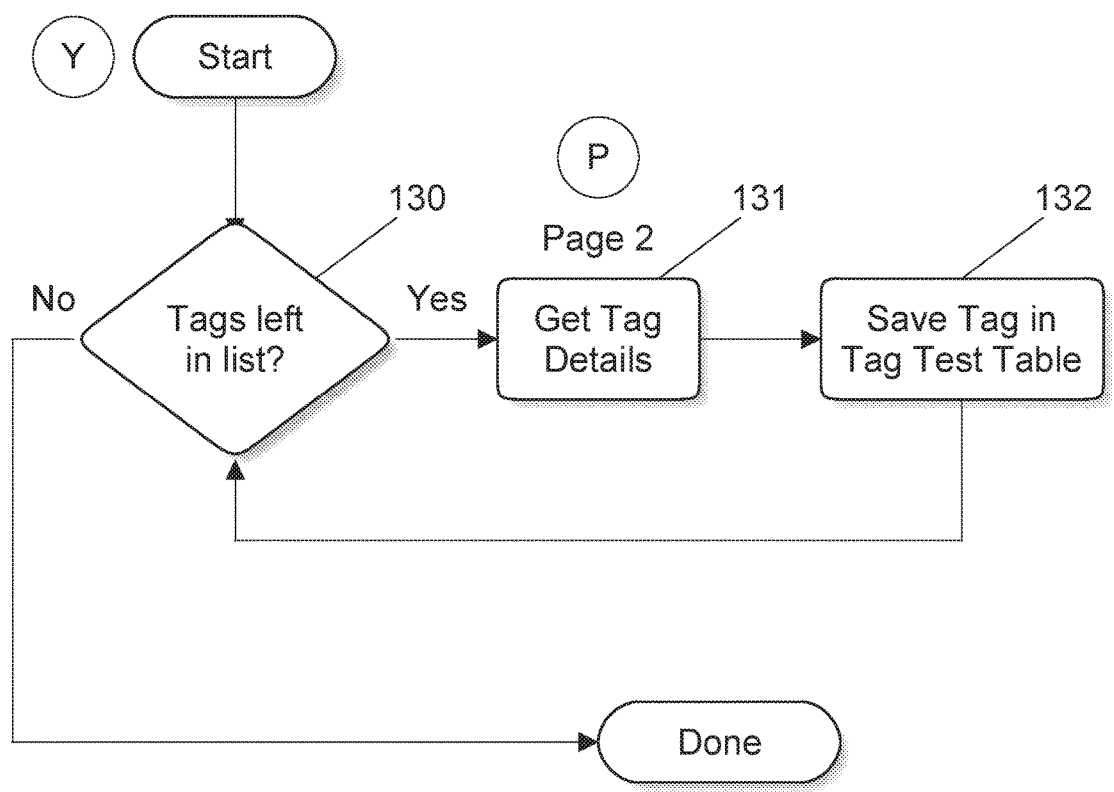
FIG. 8B is a flow-chart illustrating one embodiment of processing a "test" read session.
Figure 8C:
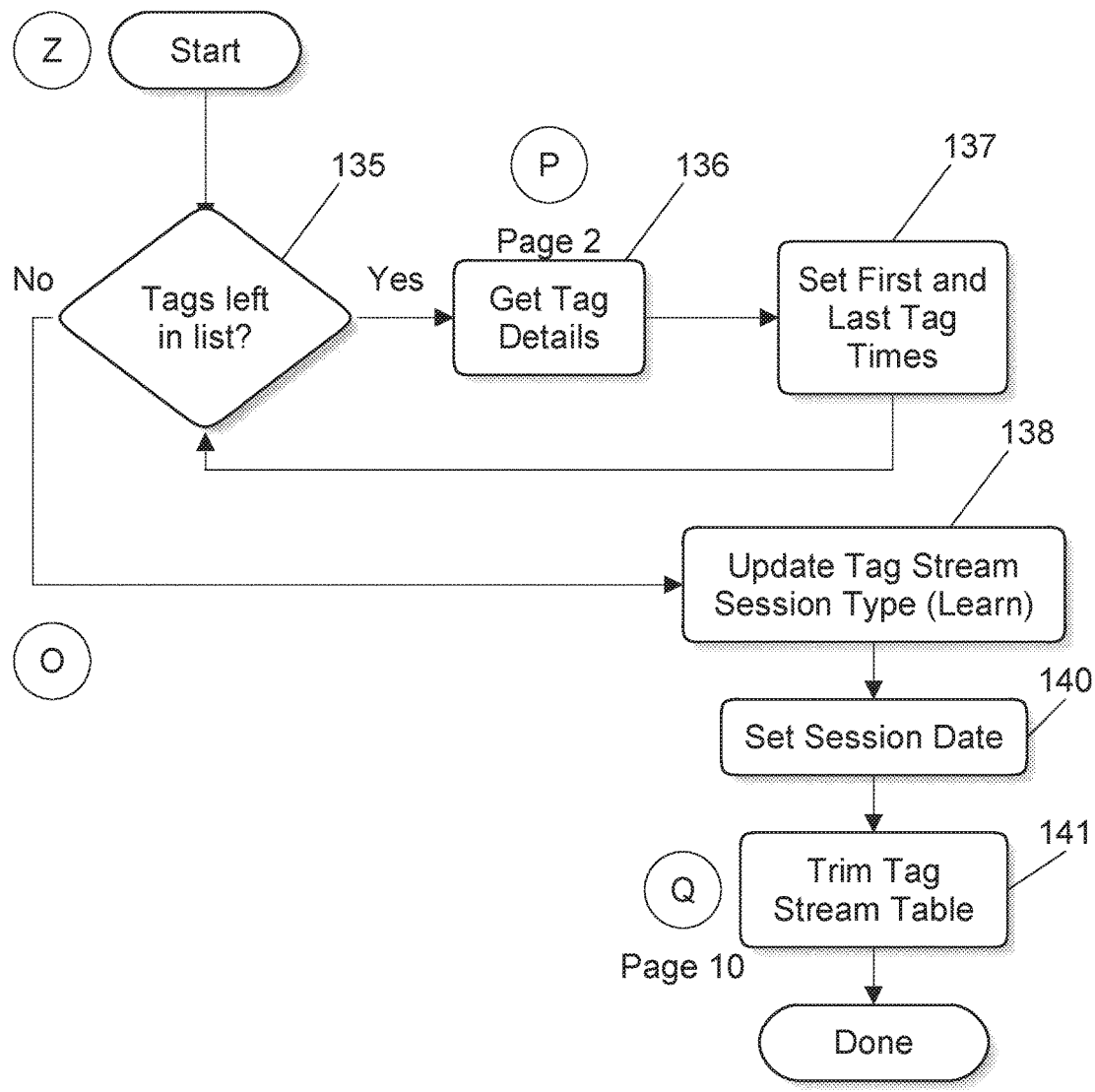
FIG. 8C is a flow-chart illustrating one embodiment of processing a "learn" read session.

As suggested in FIG. 7, step 117, one mode of processing a tag list is through a learn session described in FIG. 8C. The purpose of the learn mode is to provide data allowing the system to develop historical RSSI values for each tag as it remains stationary in a given location. Steps 135, 136, and 137 in FIG. 8C establish an iterative loop which, for each tag in the list, retrieves the tag details and sets the first and last tag times. When all tags in the list have been processed through this loop, step 138 labels the session type as "learn" and step 140 sets the session date. Finally, step 141 calls the trim tag stream table procedure described above in reference to FIG. 14. It should be understood that a "learn" session commits data to the live data set (i.e., the most recent 30 tag reads as per step 91 in FIG. 5B).

Similarly, another mode of processing a tag list is through a test session described in FIG. 8B. One purpose of the test session is when a user wishes to collect data and not have the data affect the "live record." For example, where a user is merely collecting data to trouble-shoot the system under controlled conditions. Thus, in steps 130 to 132 of FIG. 8B, the system cycles though a list of tags from a specifically executed read, retrieves the tag details (as described above) and then saves the tag in a distinct Tag Test table. Thereafter, the user may analyze this data for whatever purposes necessary. As explained above, the "test" session does not commit data to the live data set.

Figure 15A:
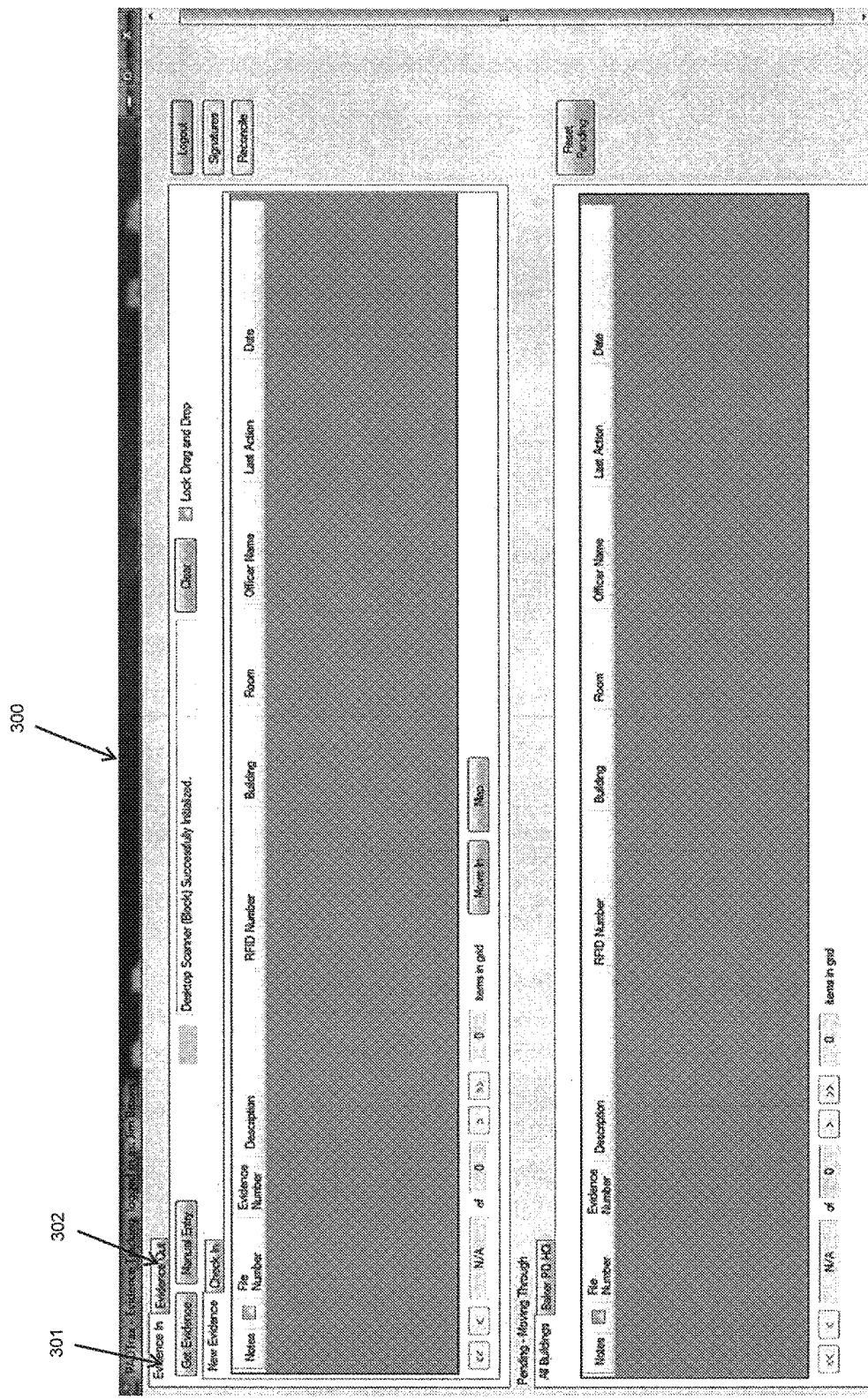
FIGS. 15A to 15T illustrate of an user interface windows generated by one embodiment of the client software

FIGS. 15A to 15T illustrate one example of an user interface generated by the client software. FIG. 15A shows a main application screen having upper and lower window areas. The upper window has two main tabs, "Evidence In" and "Evidence Out" which present user options related to moving specified items of evidence into and out of, respectively, the evidence storage area. The lower window will show specified items of evidence which have been scheduled or "pended" for movement and are awaiting completion of the scheduled movement.

To initially enter an item of evidence into the system to create an "evidence record", the user may click the "manual entry" button illustrated in FIG. 15A. This will open the window seen in FIG. 15B, allowing the user to manually enter various descriptive information regarding the item of evidence. This may include drop down menus of typical evidence types and categories (e.g., "firearms" being one category suggested in FIG. 15B). Other information may include "User Defined" fields set aside for allowing a user to input data fields the user wishes to associate with the evidence record and which are not already tracked in the standard form. For example, where "serial number" is a standard field, user definable fields are available to record additional data particular the user's customary usages (thus, the system allows for custom names to be applied to these field). As an alternative to the "Manual Entry" process, the system may directly import ("Get Evidence") evidence record data from import methodologies such as file, DDE, ADO, FTP, and WEB Services.

Figure 15B:
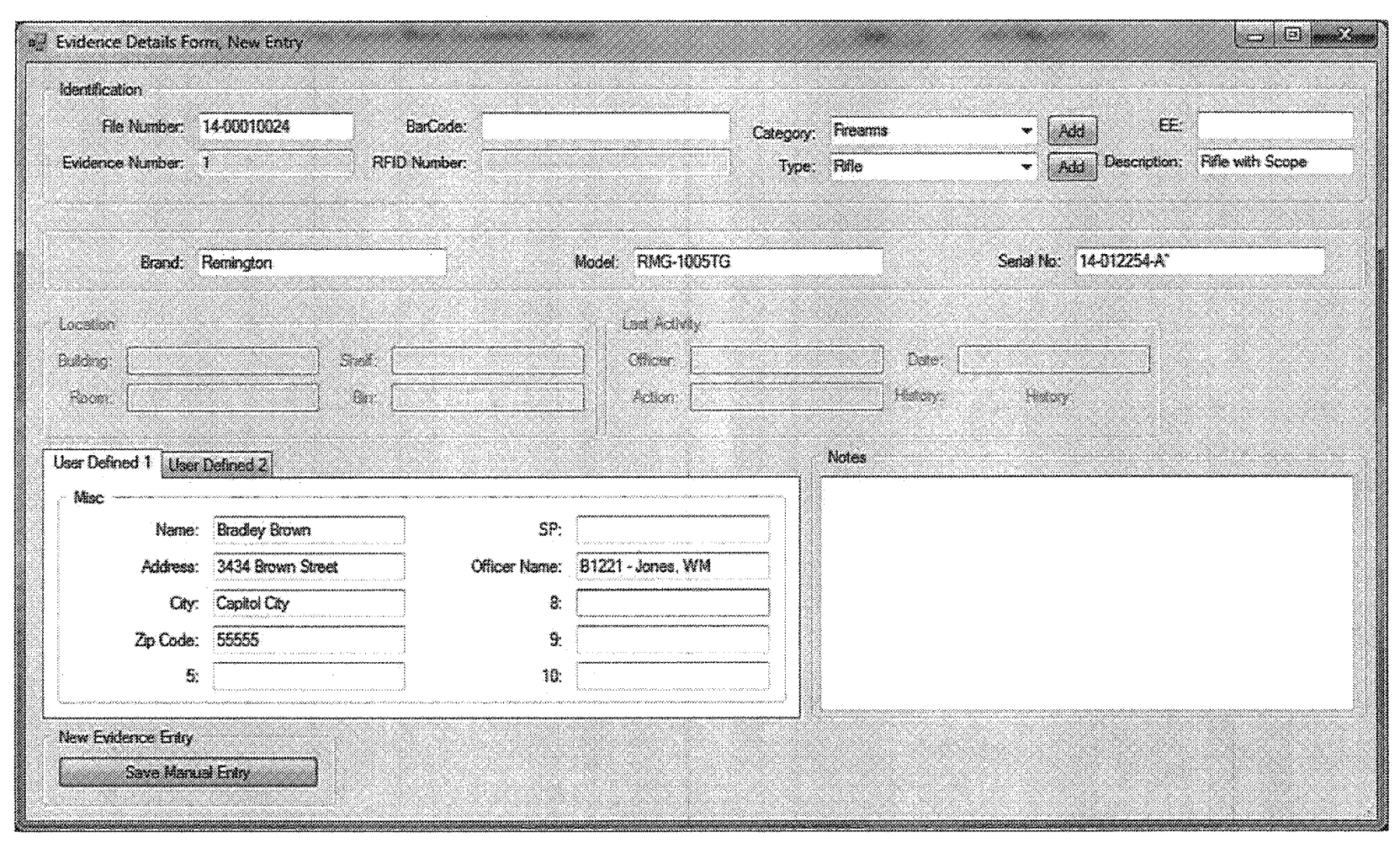
Figure 15C:
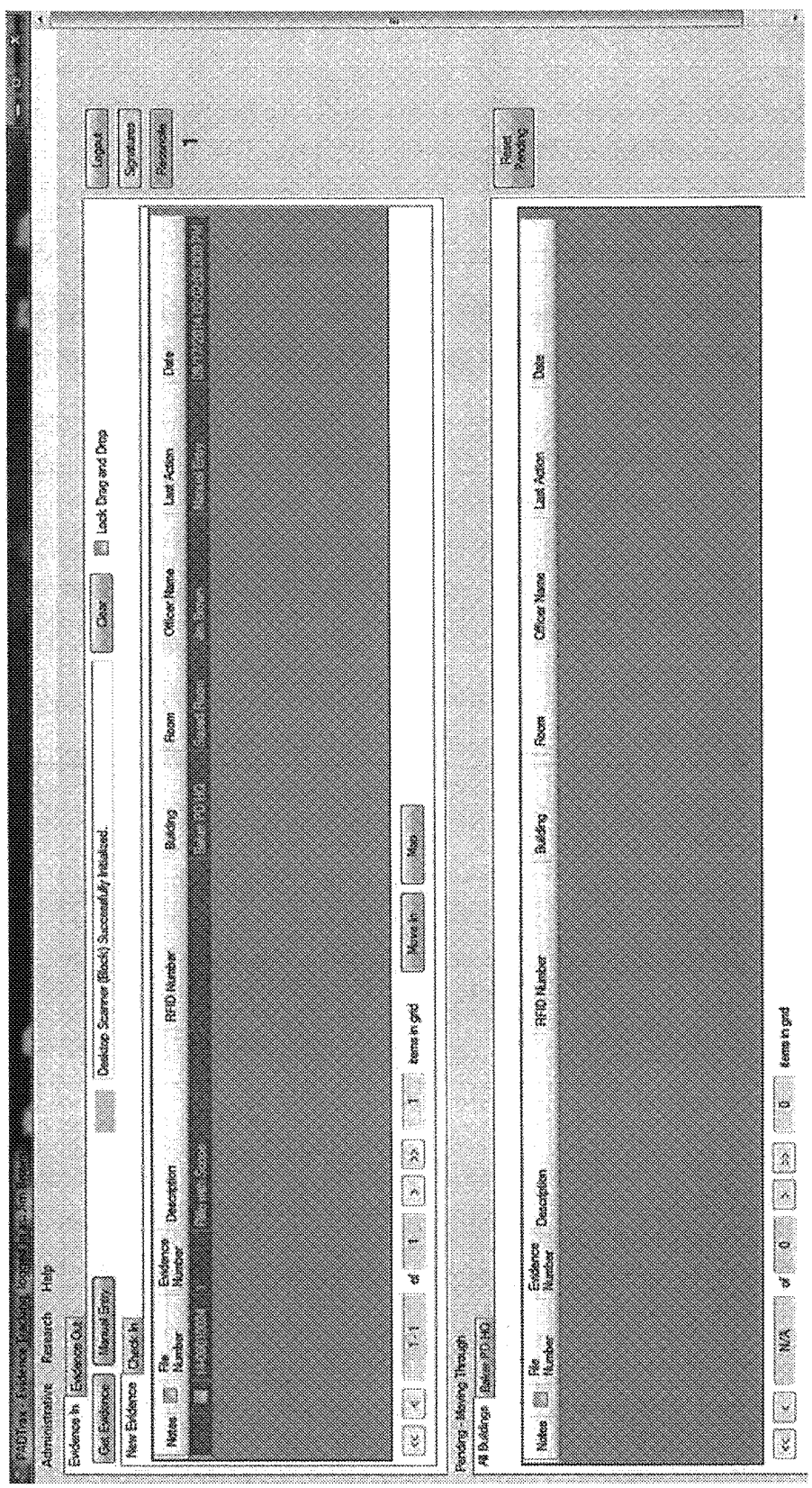
Figure 15D:
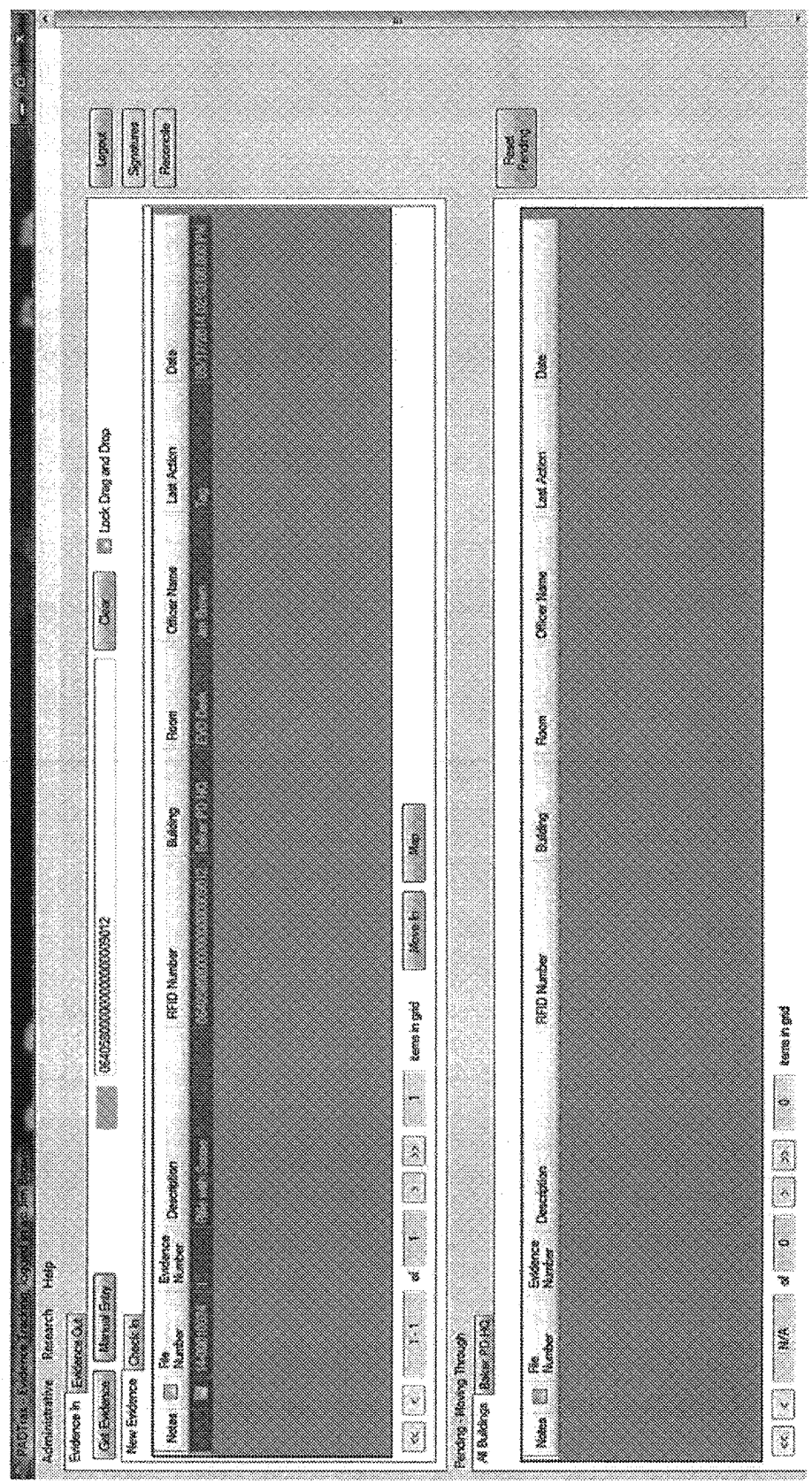

FIG. 15C illustrates the main application screen listing the specific evidence record manually entered via the window of FIG. 15B. Note that at this time, no RFID number has been associated with the evidence record. As described in reference to FIG. 2, one item of associated hardware in many embodiments will be a near field RFID reader or "block." In order to associate or "marry" an RFID tag number to the evidence record highlighted in FIG. 15C, a "new" RFID tag (i.e., one not previously associated by the system with an item of evidence) will be scanned at the block and the RFID tag attached to (or was previously attached to) the bag/container holding the evidence (or other physical evidence label such as a hang-tag tied to a firearm). Upon scanning of the RFID tag at the block, the RFID tag number is associated with the evidence record as suggested in FIG. 15D.

Figure 15E:
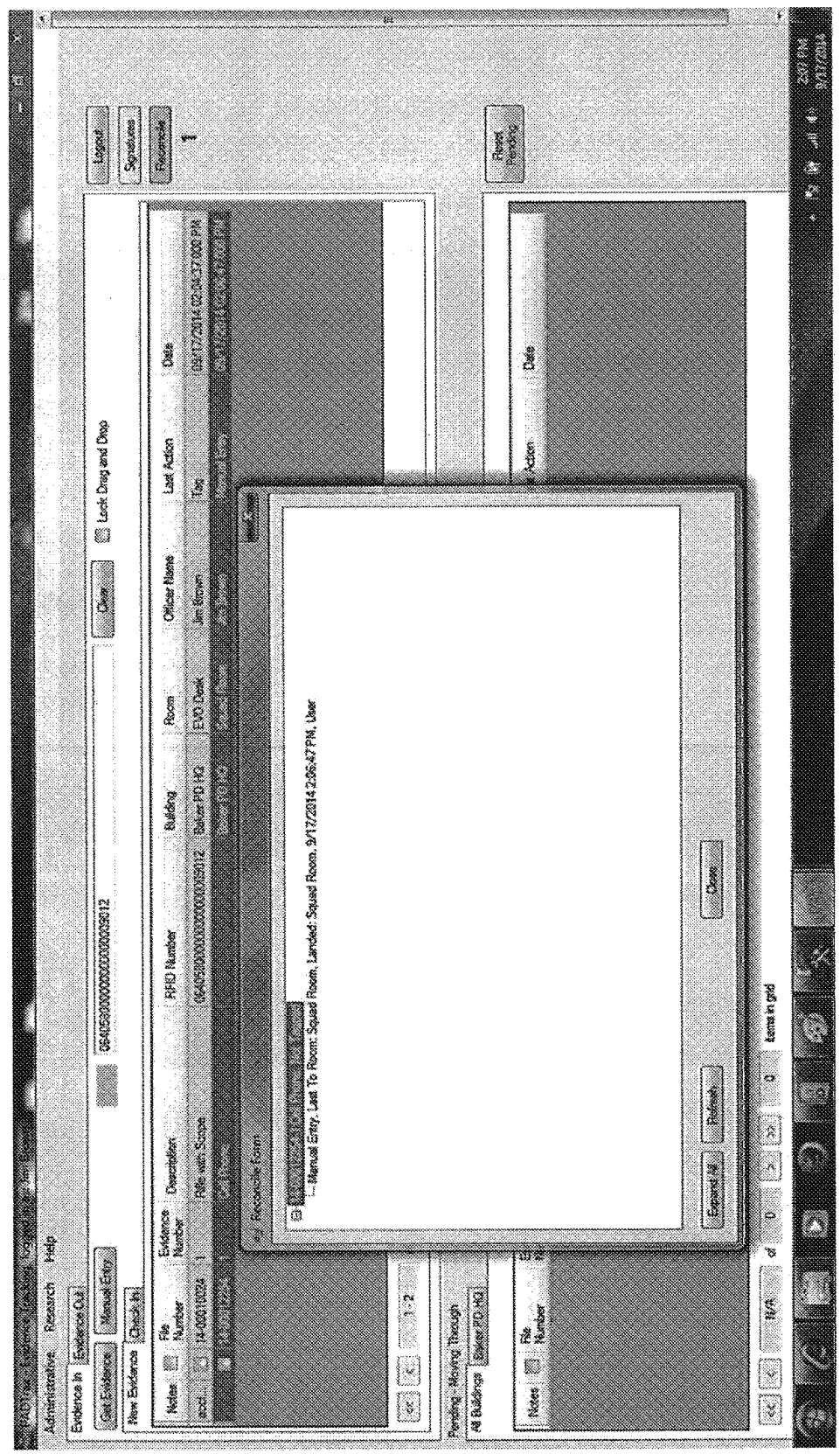

FIG. 15E suggests one example of how the system will alert the user to incomplete records. Because the "cell phone" evidence record seen in FIG. 15E does not yet have an RFID tag associated with it, the "Reconcile" button in the upper right of the screen indicates "1" unreconciled evidence record exists. When the user clicks the "Reconcile" button, a window opens showing the unreconciled record and indicates the issue with this record, e.g., "Not Tagged" in this specific example. When the user scans a new RFID tag to be associated with this evidence record, the record will then be reconciled and no unreconciled records will be indicated in the upper right portion of the screen.

Figure 15F:
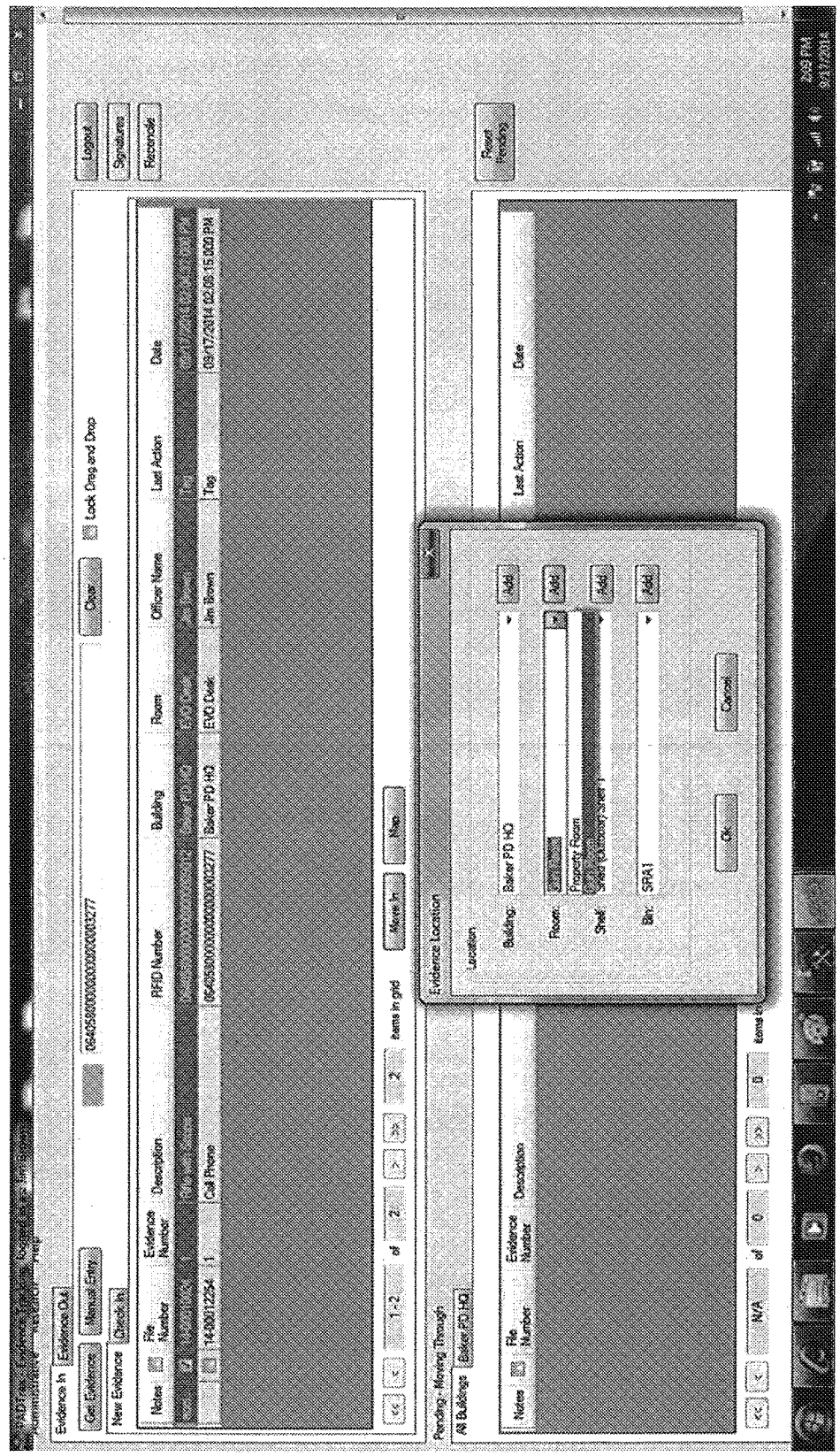
Figure 15G:
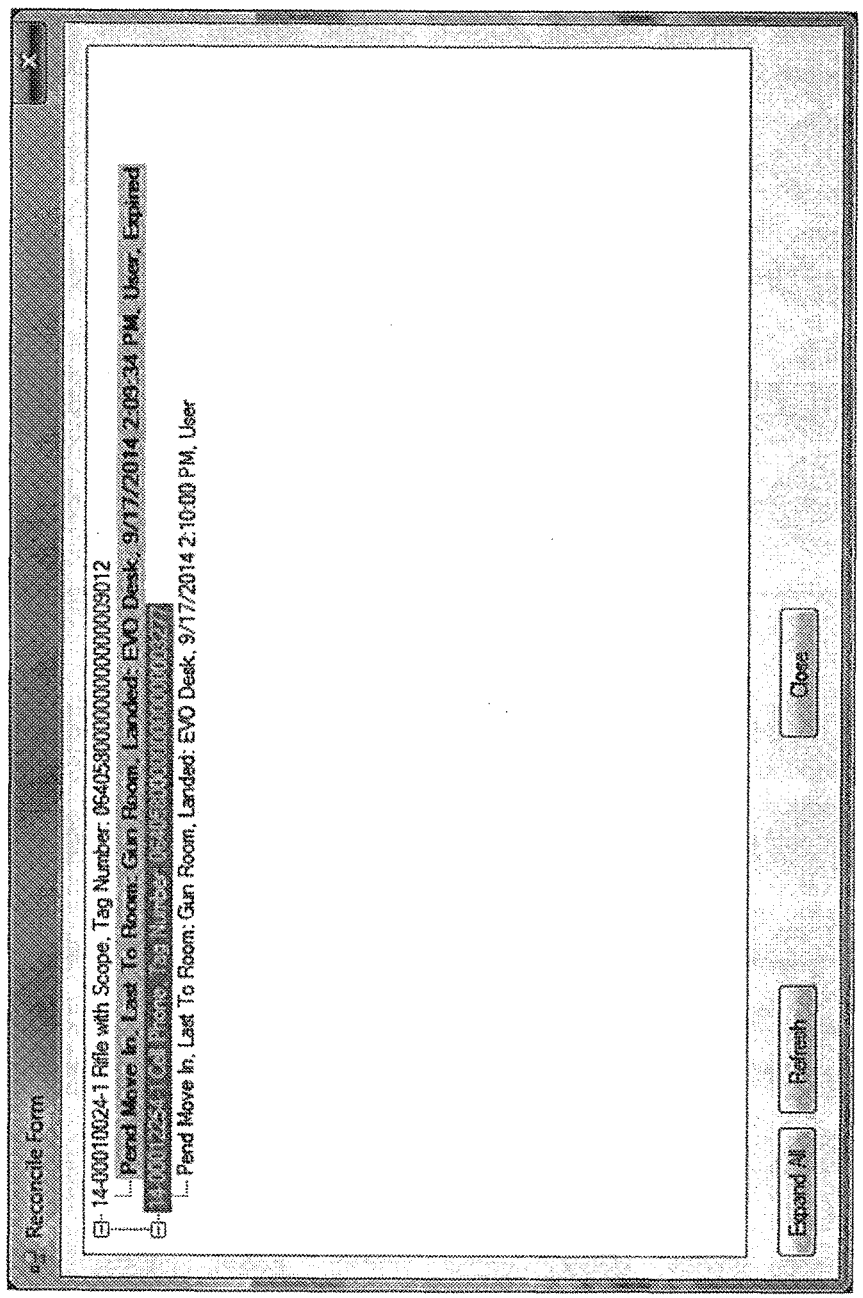
Figure 15H:
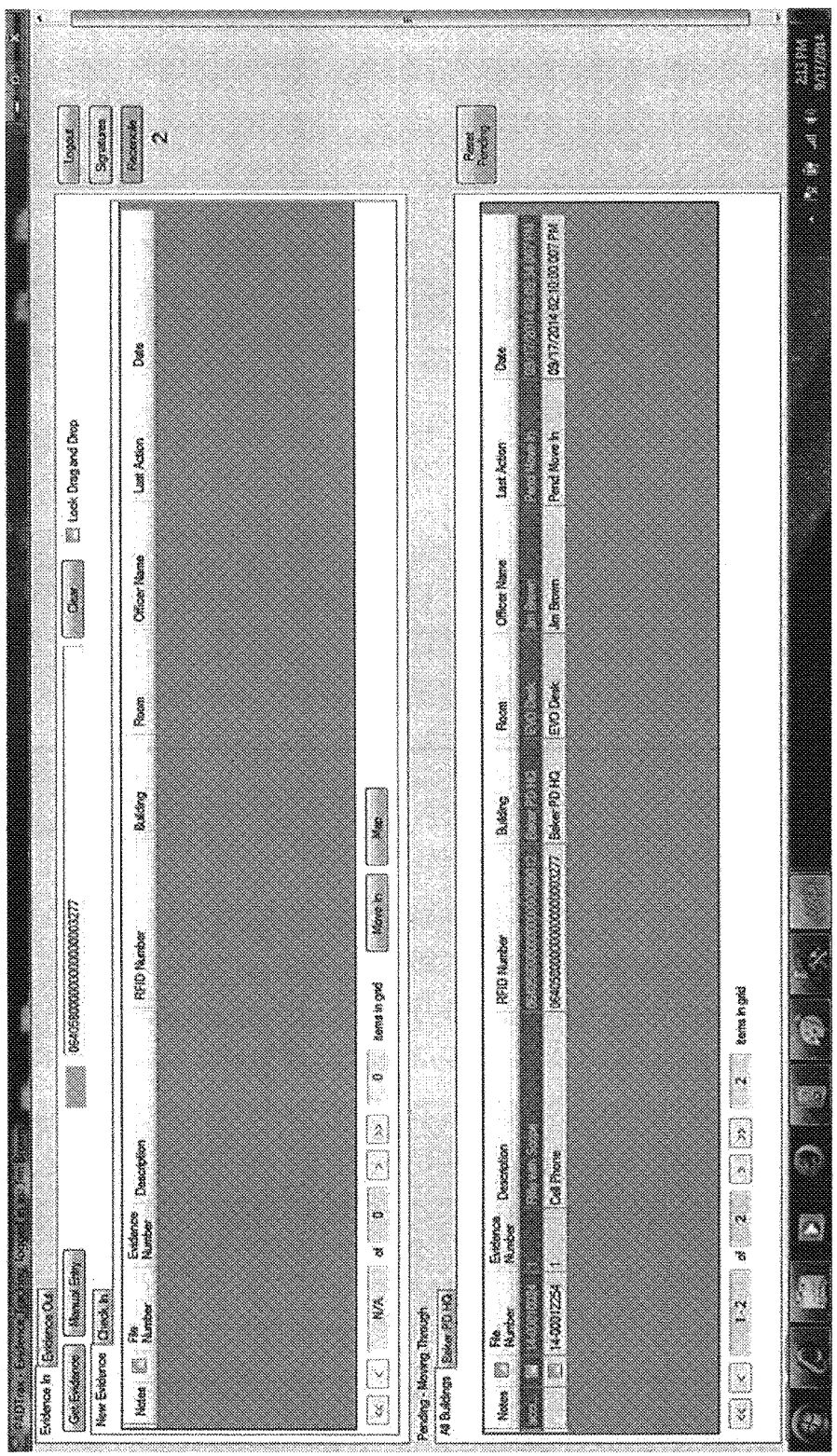
Figure 15I:
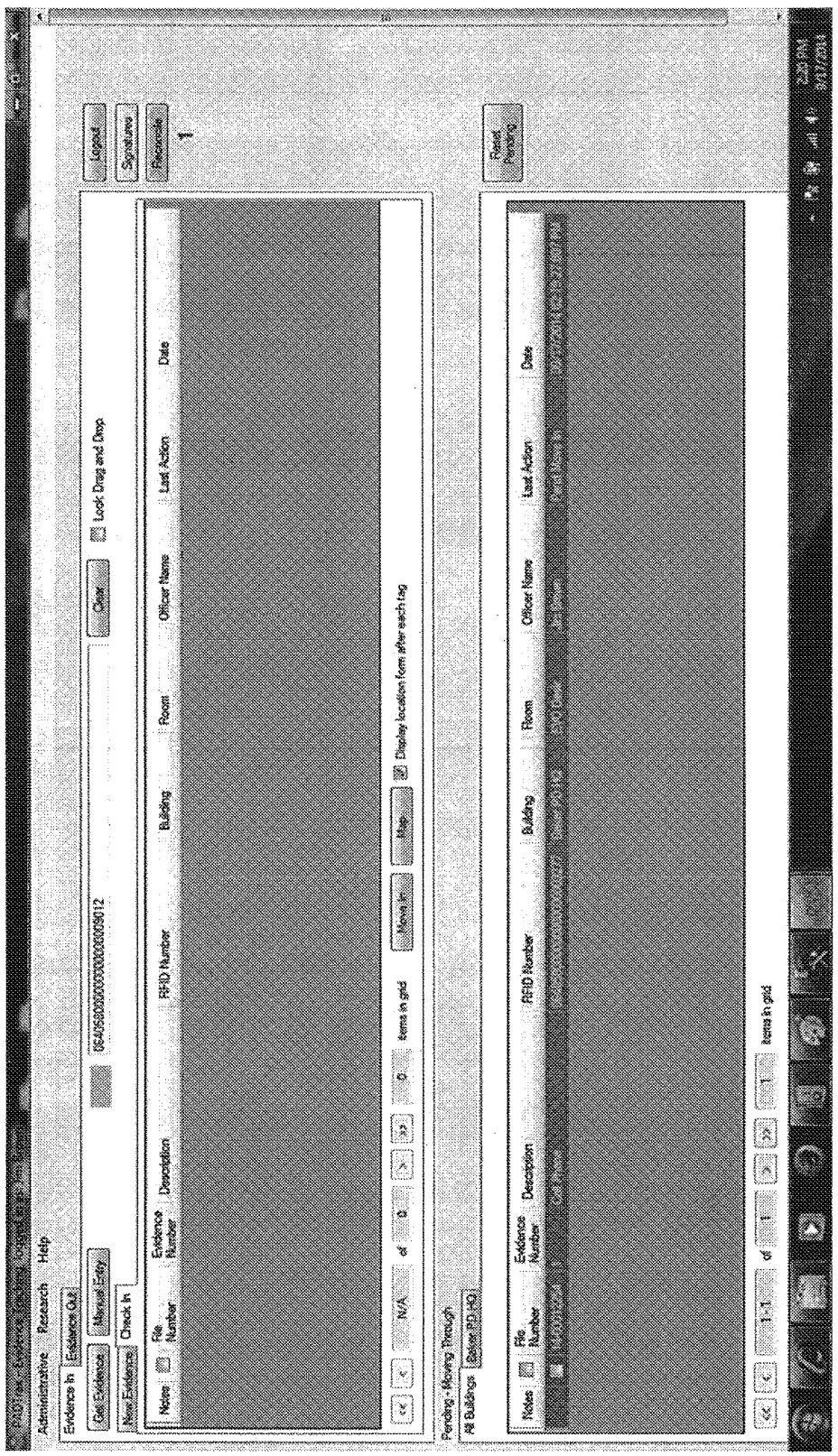

FIG. 15F illustrates the process for "pending" an item of evidence for moving into the secure room where the evidence will be stored. The user clicks the "Move In" button on the main "Evidence In" screen to open the "Evidence Location" window. This window allows the user to enter (e.g., via drop down menus) specific location information such as building, room, shelf, and bin regarding where the evidence item is intended to be stored. FIG. 15G again shows an unfinished activity in a reconcile window and illustrates message differentiation based on the activity. For example, the highlighted alert has been triggered because the "Rifle with Scope" item has not moved in within the alert horizon. In FIG. 15H, the two evidence records have been completely pended-in and the system moves the records to the lower window to show their status as items pending move-in. In this state, the system has not detected the associated RFID tags passing reader antennas at the door of an evidence room (e.g., antennas 18 in FIG. 1) and has yet to perform the logic described earlier to "determine" whether the item of evidence has been physically moved into the designated evidence room. Therefore, the system considers that there are two evidence records "unreconciled" as suggested by the integer below the "Reconcile" button in the upper right of the screen in FIG. 15H. FIG. 15I suggests the state where one of the evidence items ("Rifle with Scope") has been detected by the door antennas 18 and the system has determined that the item of evidence moved into the secure room for which the item was pended. Thus, this evidence record is removed from the lower half of the screen and the number of "unreconciled" records is reduced to one. With the foregoing example, it can be understood how the system monitors the status of an evidence item from the time when the item is entered into the system until the time when the item reaches its intended destination. When any item of evidence fails to reach its intended destination within an allotted time period, the system may generate appropriate reminders and alerts that there may be an issue with the evidence item not being properly or timely processed.

Figure 15J:
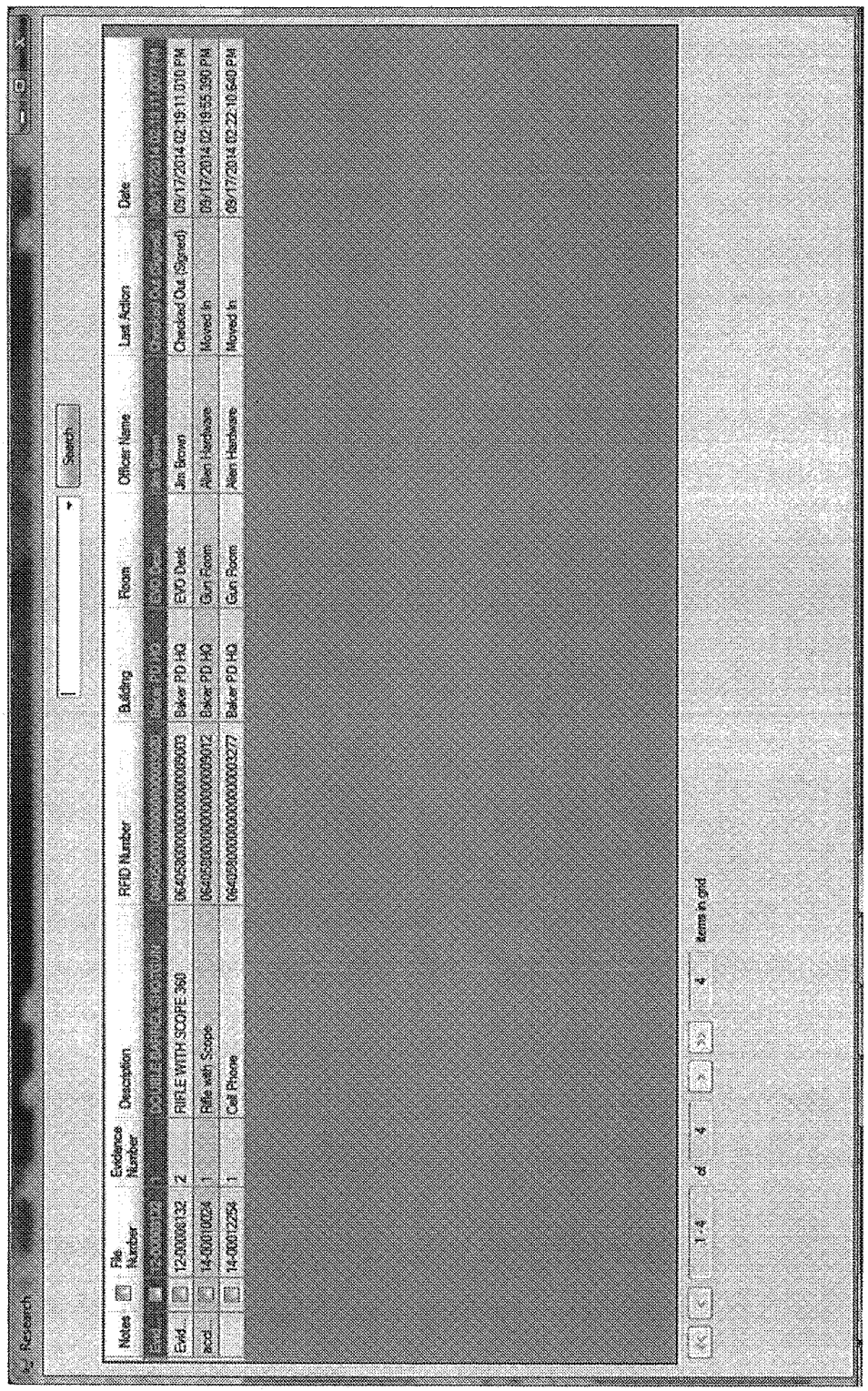

Another window generated by the illustrated embodiment of the system software is the "research" window seen in FIG. 15J (e.g., opened by clicking the "Research" button seen top left in FIG. 15I). The research window of FIG. 15J lists evidence records in the system and provides selected information on the evidence item, most notably the "last action" showing whether the evidence item is "checked out," "moved in," etc.

Figure 15K:
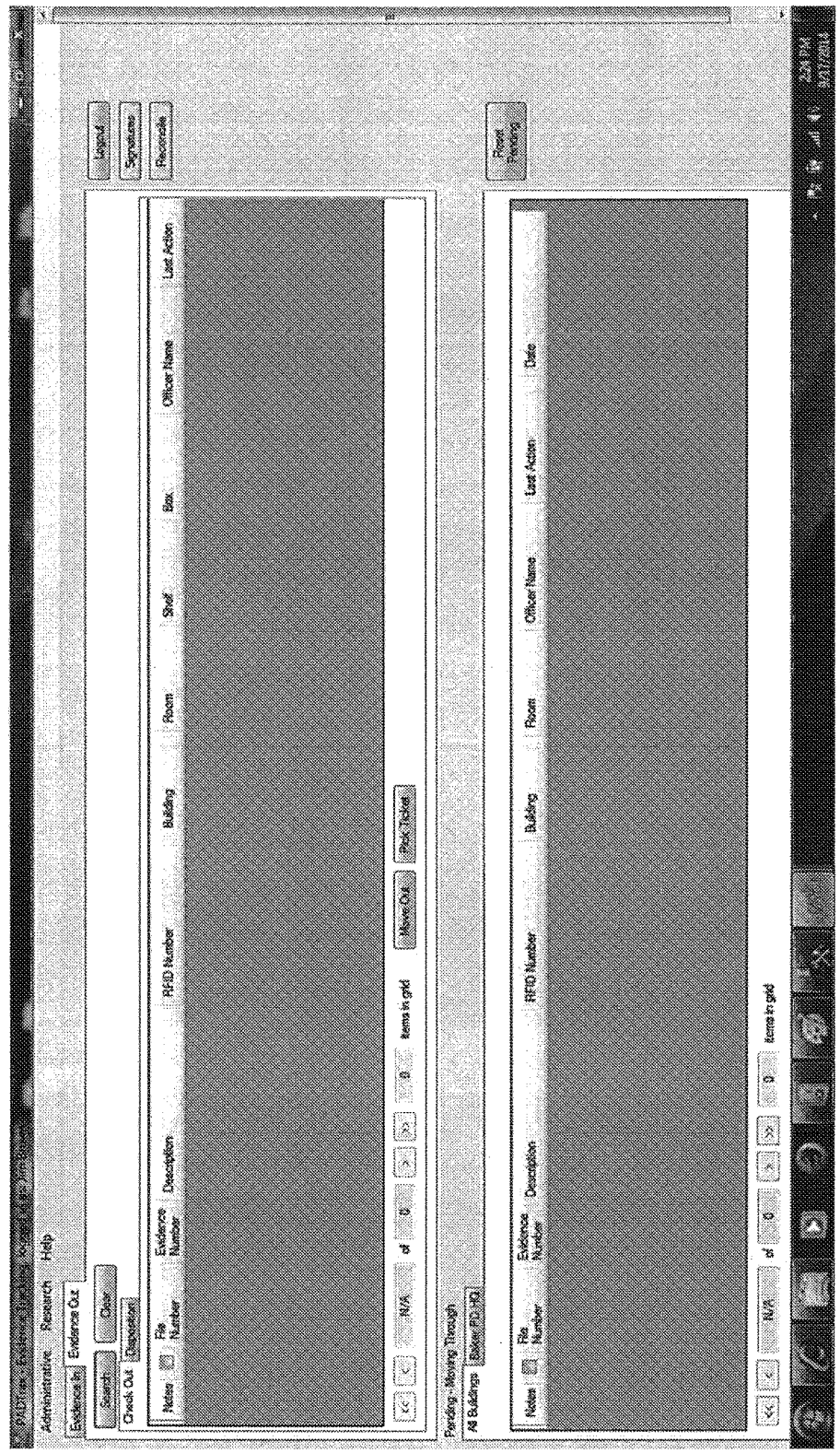
Figure 15L:
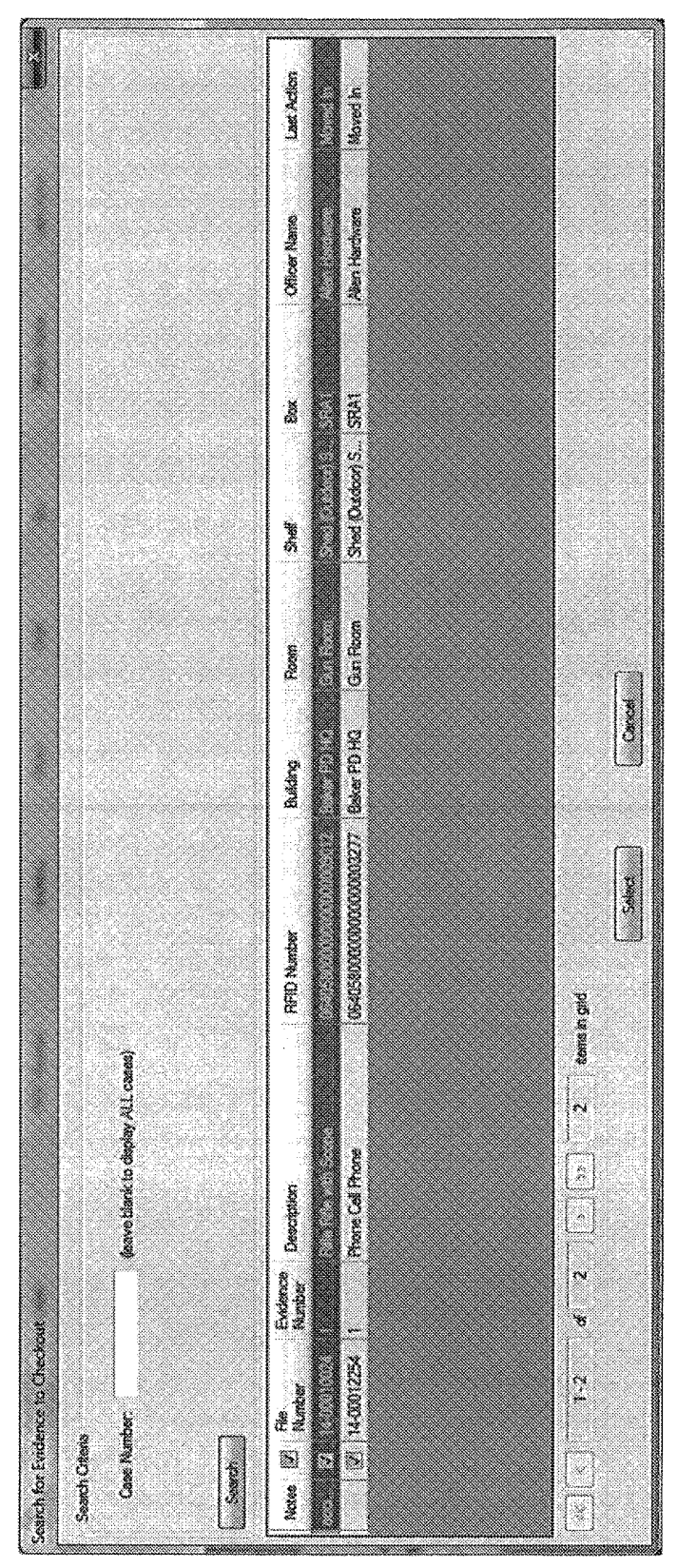
Figure 15M:
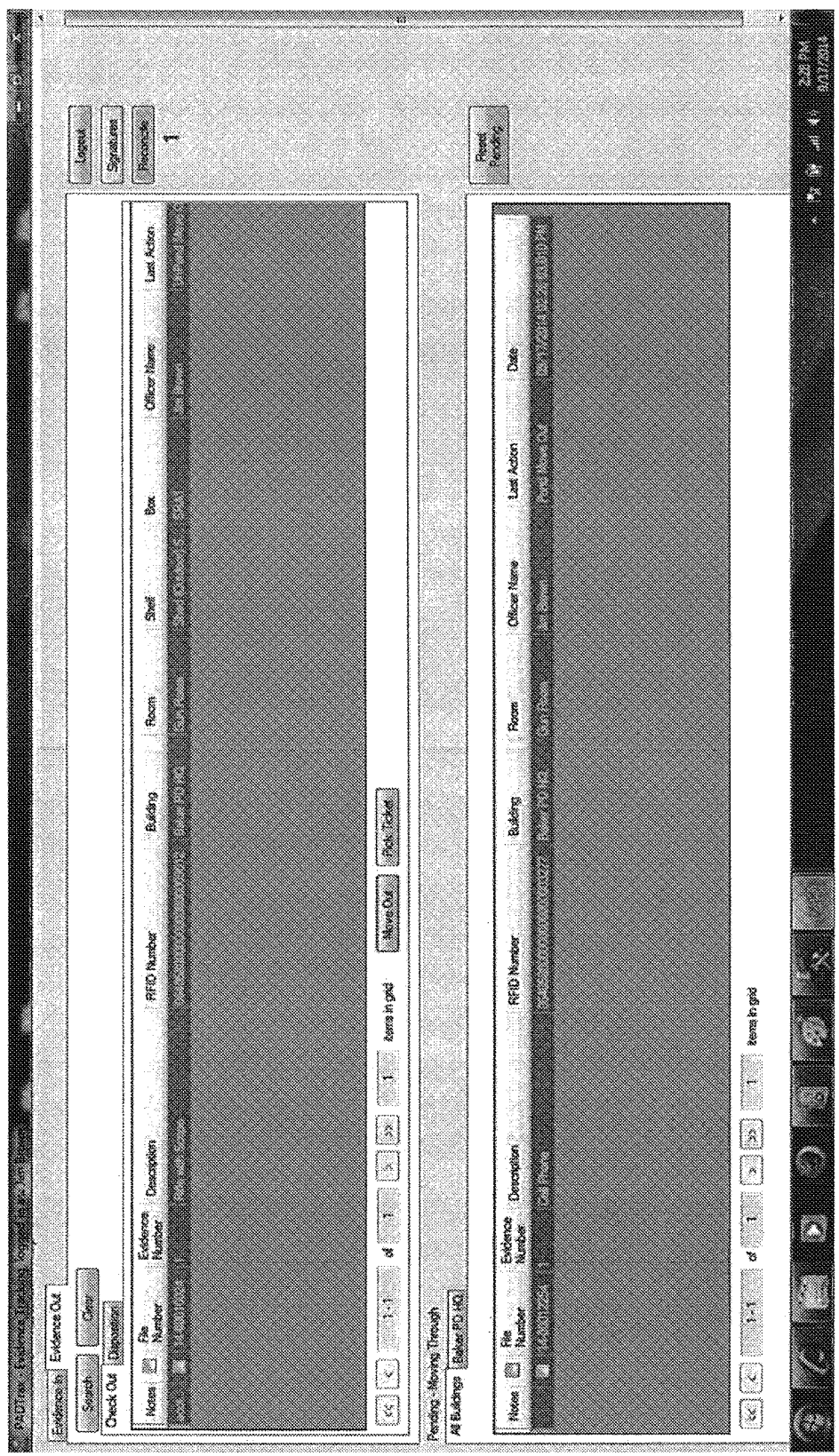
Figure 15N:
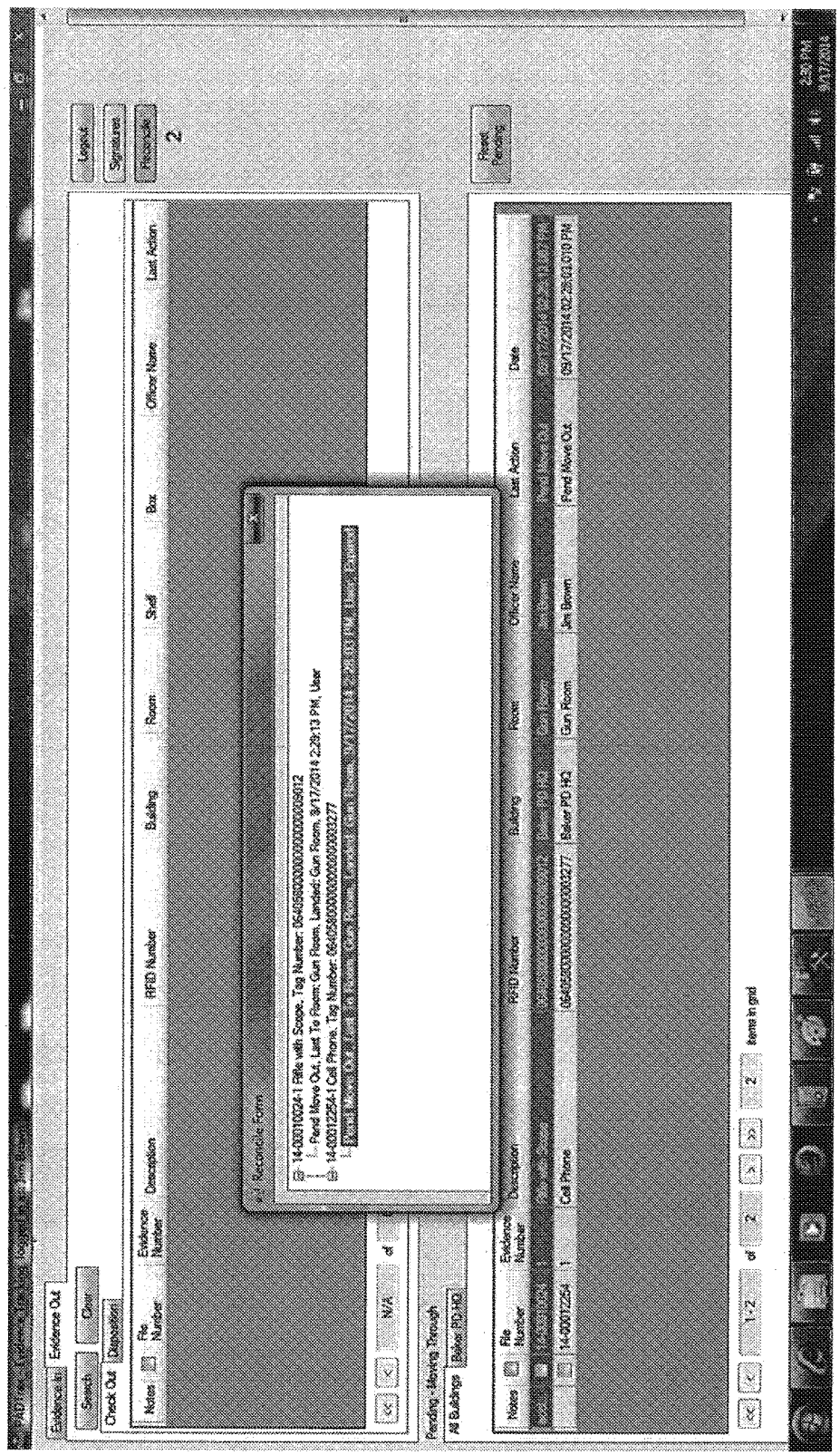
Figure 15O:
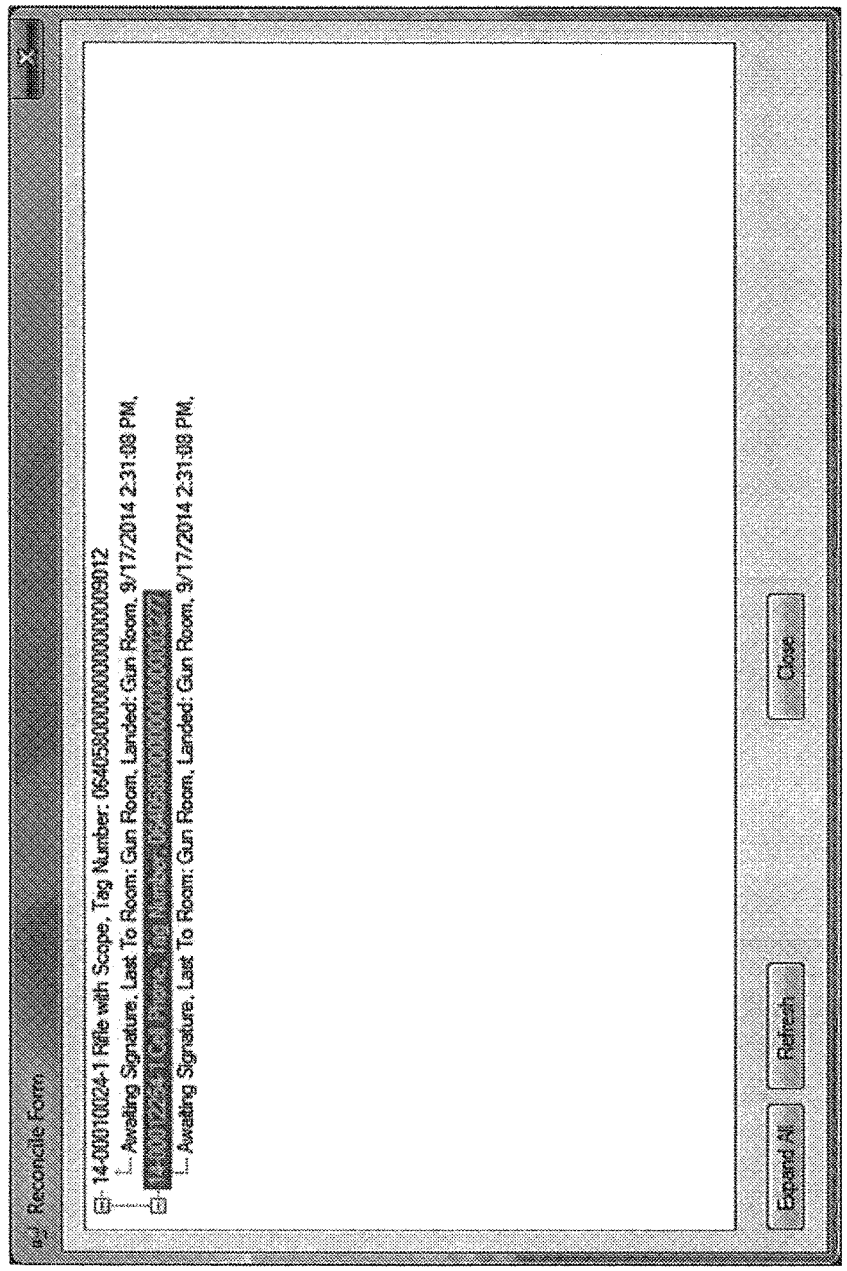
Figure 15P:

FIGS. 15K to 15P suggest certain windows presented to the user in the process of "checking out" an evidence item (e.g., properly removing the evidence item from the secure location for use in court proceedings, etc.). FIG. 15K shows the window after the user has clicked the "Evidence Out" tab, which is divided into upper and lower windows similar to the "Evidence In" main window. Clicking the "Search" button in FIG. 15K will open the search window shown in FIG. 15L. This window lists all evidence records and allows the user to search for particular records by entering search terms (e.g., "Case Number") or by scrolling through the list of evidence records. FIG. 15M illustrates the situation where one record ("Cell Phone") has been pended for move out by highlighting the record and clicking the "Move Out" button, while another record remains in the upper grid. In the illustrated embodiment, the upper grid allows the user to build a queue of items to be moved out. The user may queue the records one at a time and then with a single click, move all the records to the lower grid. Nevertheless, it will be understood that the upper grid is only a queue and no action or record modification is applied to the evidence record while in the upper grid. Because the system has not detected the "Cell Phone" evidence item physically leaving the evidence room, the record remains an "unreconciled" record as suggested by the "1" in the upper right portion of the screen. FIG. 15N shows that both evidence records have now been pended for moving-out. Additionally, FIG. 15N shows a "reconcile" window at a point when the pre-set time horizon form removing the "Cell Phone" item from the evidence room has expired. Thus, the system may generate reminders or alerts as to this evidence item not being handled in a timely or possibly an improper manner. FIG. 15O suggests a system window generated at a point where the system has detected the pended-out items leaving the evidence room, but the final sign-out procedure has not been performed. Thus, the reconcile window indicates the items are still "unreconciled" in the sense that the items have not been signed for by the person taking custody of the items (e.g., an assistant district attorney taking the items to a court hearing). FIG. 15P is a signature window suggesting how the person taking custody of the evidence will sign at an electronic signature pad in order to complete the checkout procedure and have the evidence record removed from the "unreconciled" list.

Figure 15Q:
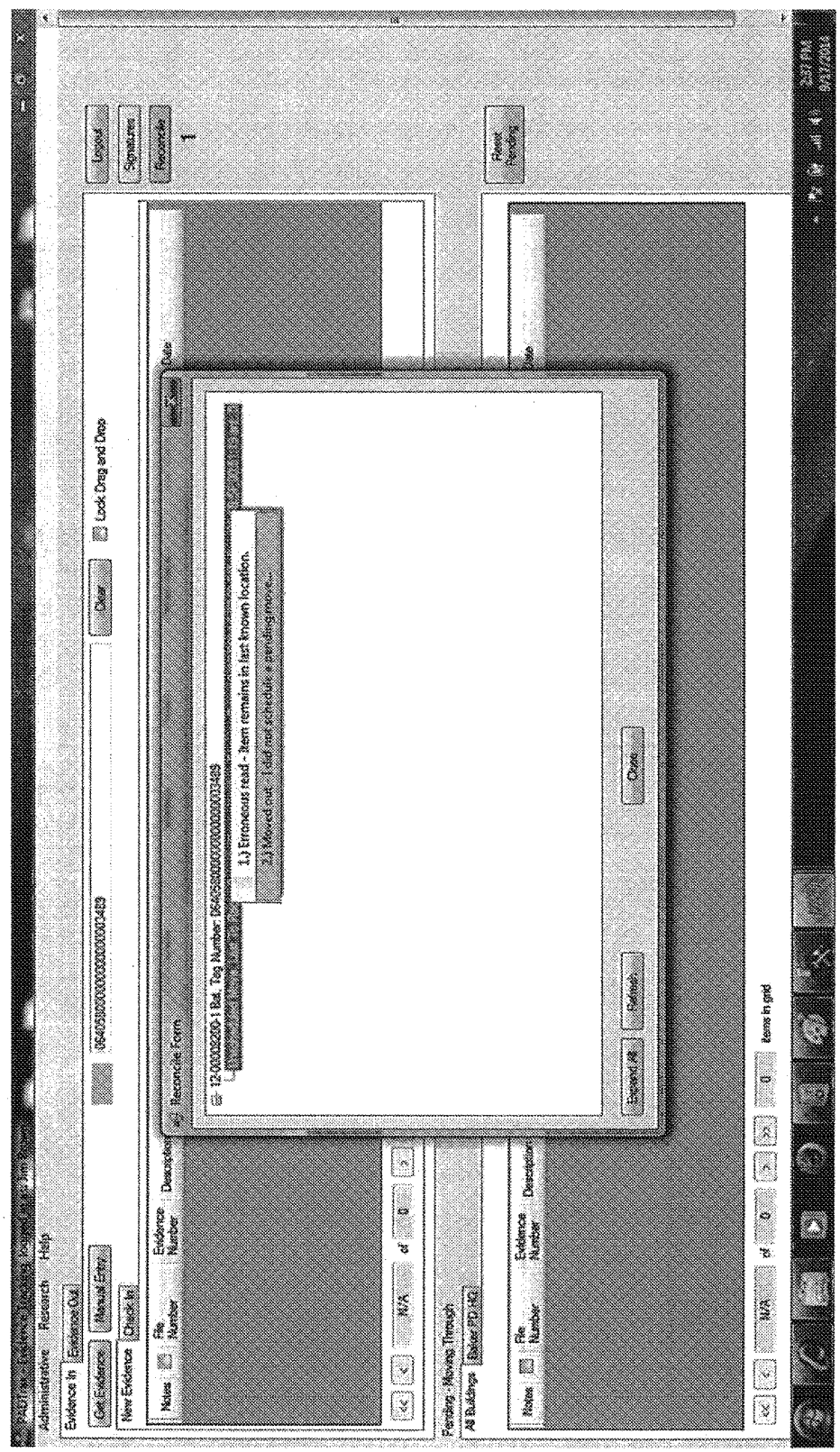
Figure 15R:
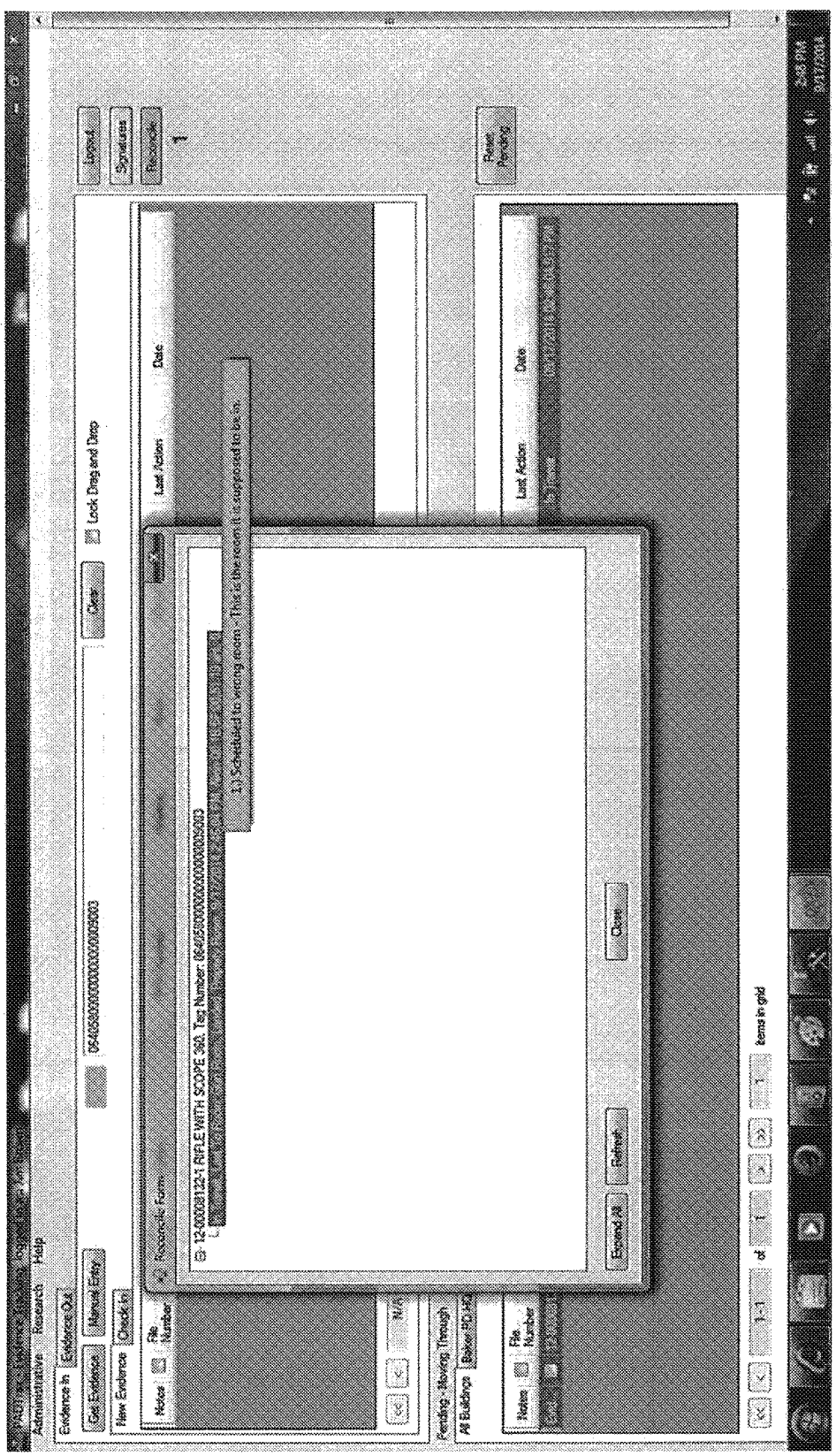

FIGS. 15Q and 15R illustrate additional reconciling functions performed by certain embodiments of the system. FIG. 15Q illustrates a window generated when an "unscheduled move" out (or in) is detected, i.e., when the system determines an item of evidence has left (or entered) an evidence room and the item's record has not pended for moving-out (or moving-in). In this circumstance, the system notifies the user in a reconcile window such as seen in FIG. 15Q. In this example of the software, the user is given the choice of reconciling the reported unscheduled move by either (1) selecting erroneous read (i.e., the user physically checks the item is in fact still in the evidence room); or (2) selecting that the item was in fact moved out, but there was a user failure to pend the record for check-out. Upon the selecting the second option, the system will direct the user to the signature window as seen in FIG. 15P. In the event of an unscheduled move into the evidence room, the system will allow a user to acknowledge the item was moved in via the reconcile window and prompts the user to specify the item location (e.g., shelf and bin).

FIG. 15R illustrates the situation when the system determines that an item has moved into a particular evidence room (e.g., a facility having multiple secure evidence rooms), but the item was not scheduled for entry into that evidence room. In this instance, the reconcile window could give the user the option of selecting that the item was mistakenly pended into another room, but the current room as determined by the system, is in fact the correct location. Alternatively, the system could query the user as to whether the detected item was in fact accidently brought into the evidence room or whether the item was intended for movement into that room, but simply not pended for a move-in within the system. Unscheduled moves also carry alert horizons and notification can be by methods other than or in addition to the reconcile window (e.g., email, SMS, etc.).

Figure 15S:
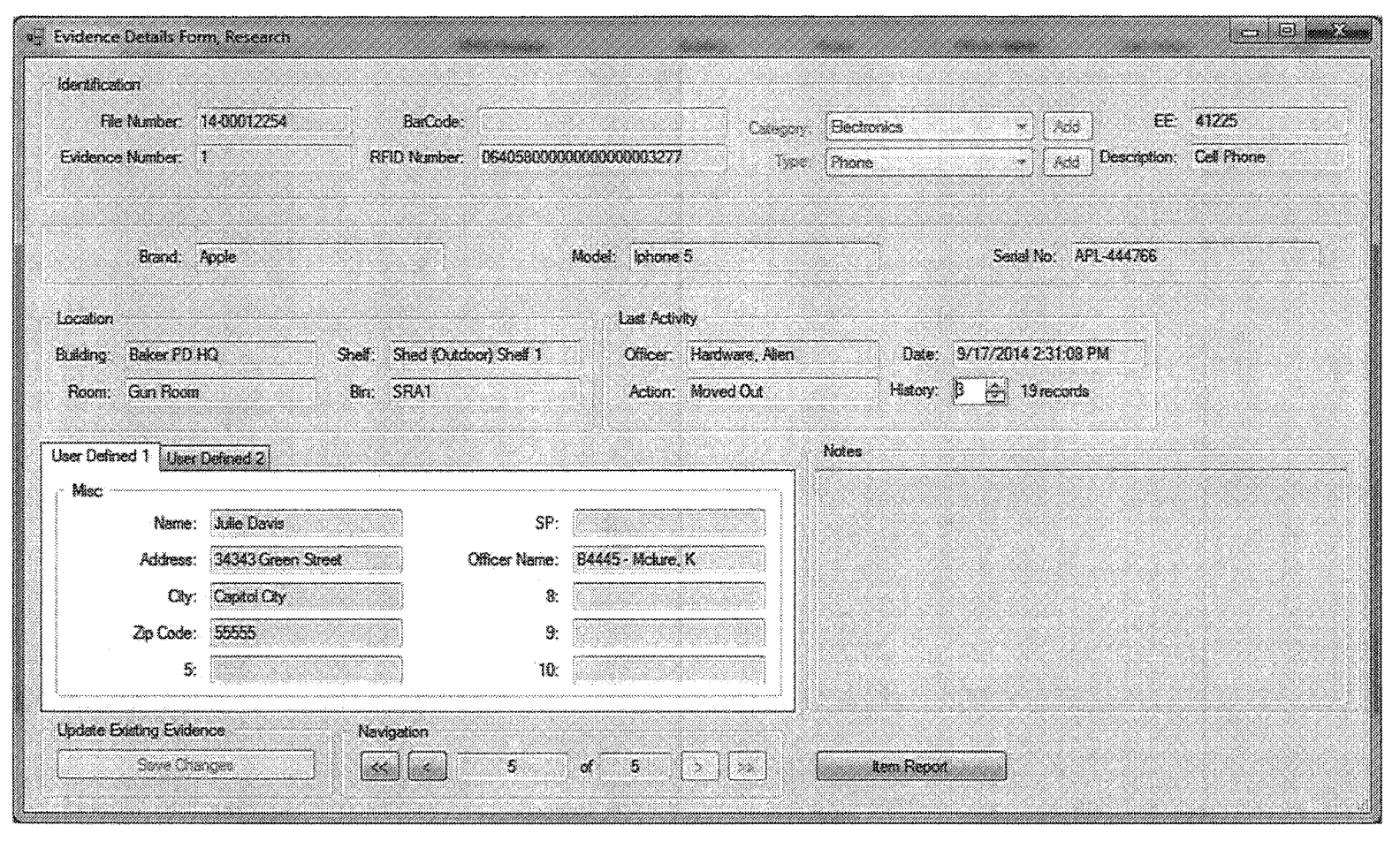

FIG. 15S illustrates a research window with a "History" drop-down menu. FIG. 15T illustrates how selecting the "History" menu will open a window listing all actions taken in regards to that particular evidence item and its record. It can readily be understood how and why such a history of the evidence item's handing could be critical to the items admissibility in court proceedings.

Although the above disclosure has taken the form of a few example embodiments, those skilled in the art will understand there are many obvious modifications and variations of the described system and methods. For example, where the above description indicates notification to the user, it will be understood that this notification took take any number for forms, for example an audible alarm, a visual alarm, or a display of specific items which are the subject of the notification. Likewise, various reading sessions (e.g., Entry/Exit/Audit readings) may be discrete periods of the Reader's transceiver being turned on and off. Alternatively, the Reader's transceiver could operate continuously and Entry/Exit/Audit sessions can be selected time frames extracted from the continuous Reader operation. Thus, "executing" or "establishing" an Entry/Exit/Audit read could be performed by either of the above methods (or other methods).

Although many of the above embodiments disclose a system with a door entry/exit sensor, other embodiments could forego this feature. For example, a system continuously tracking the phase angle of tags in the vicinity of a storage facility entranceway could monitor changes in phase angle to determine the approaching entrance or exit of tags into the storage facility.

The invention claimed is:

1. An object tracking system comprising:
   a. an RFID reader having at least one antenna positioned along an interior entranceway of an object storage facility;
   b. an entry/exit sensor capable of sensing entrance and departure of an individual through the entranceway;
   c. a door sensor configured to detect a closing of a door to the object storage facility;
   d. a processor communicating with RFID reader and the entry/exit sensor, the processor running software to perform the steps of:
      i) executing an entrance reading and an exit reading for RFID tags upon an individual entering and exiting, respectively, through the entranceway;
      ii) initiating an audit session including a timed sequence of at least two audit readings upon detection of the door closing after the individual has exited the storage facility;
      iii) interrupting the audit session if the system detects the door opening during the audit session;
      iv) returning an indicator that a target RFID tag is present in the storage facility if:
         1) the target RFID tag is detected upon the entrance reading and not detected on the exit reading; or
         2) the target RFID tag is detected on the exit reading and the target RFID tag is detected on at least one audit reading.

2. The object tracking system according to claim 1, wherein the system returns an indicator that a target RFID tag is absent from the storage facility if:
   1) the target RFID tag is detected on the exit reading; and
   2) the target RFID tag is not detected on the audit reading.

3. The object tracking system according to claim 1, wherein the system performs as least three audit readings and returning an indicator that a target RFID tag is present if the target RFID tag is detected on at least two of the audit readings.

4. The object tracking system according to claim 1, wherein the RFID reader has at least two antennas.

5. The object tracking system according to claim 4, wherein the antennas are positioned between about two feet and five feet above a floor of the entranceway.

6. The object tracking system according to claim 4, wherein one of the antennas is positioned outside the storage facility.

7. The object tracking system according to claim 5, wherein the all the antennas in the system are positioned along the entranceway.

8. The object tracking system according to claim 4, wherein the system has a single RFID reader.

9. The object tracking system according to claim 8, wherein the RFID reader is connected to three antennas.

10. The object tracking system according to claim 9, wherein two of the three antennas are connect to a single port of the RFID reader.

11. The object tracking system according to claim 1, wherein the system records a signal strength of RFID tags detected over multiple readings.

12. The object tracking system according to claim 11, wherein the system compares the signal strength of an RFID tag from a current reading to an aggregate signal strength of the same RFID tag from multiple previous readings.

13. The object tracking system according to claim 12, wherein the system returns an indicator that a target RFID tag is moving or stationary based upon a change in signal strength.

14. The object tracking system according to claim 4, wherein the system returns an indicator that an RFID tag is stationary if the RFID tag is read by only one antenna.

15. The object tracking system according to claim 12, wherein if the current signal strength is greater than the aggregate signal strength, then the system returns an indicator that the RFID tag is moving.

16. The object tracking system according to claim 12, wherein the system modifies the aggregate signal strength for a particular RFID tag as the signal strength for the RFID tag changes over time.

17. The object tracking system according to claim 12, wherein if the current signal strength is less than the aggregate signal strength, then the system returns an indicator that the RFID tag is stationary.

18. The object tracking system according to claim 1, wherein (1) the system normalizes detected phase angles to compensate for perceived phase shifts resulting from a change in interrogation signal frequency, and (2) if there is no change in the normalized phase angle over multiple detections of the target RFID, then an indicator is returned that the target RFID tag is present in the storage facility.

19. An object tracking system comprising:
   a. an RFID reader having at least one antenna positioned along an interior entranceway of an object storage facility;
   b. an entry/exit sensor capable of sensing entrance and departure of an individual through the entranceway;
   c. a processor communicating with RFID reader and the entry/exit sensor, the system running software to perform the steps of:
      i) executing an entrance reading and an exit reading for RFID tags upon an individual entering and exiting, respectively, through the entranceway;
      ii) executing an audit reading for RFID tags at least once after the individual has exited the entranceway;
      iii) returning an indicator that a target RFID tag is present in the storage facility if:
         1) the target RFID tag is detected upon the entrance reading and not detected on the exit reading; or
         2) if the target RFID tag is detected on the exit reading and the target RFID tag is detected on the audit reading;

d. wherein the system determines whether a phase angle of a signal from the target RFID tag changes over multiple detections of the target RFID tag; and e. wherein if (i) there is a change in phase angle in the exit reading, and (ii) no change of phase angle is detected in at least two audit readings, then an indicator is returned that the target RFID tag is present in the storage facility.

20. An object tracking system comprising:

a. an RFID reader having at least one antenna positioned along an interior entranceway of an object storage facility;

b. an entry/exit sensor capable of sensing entrance and departure of an individual through the entranceway;

c. a processor communicating with RFID reader and the entry/exit sensor, the system running software to perform the steps of:
   i) executing an entrance reading and an exit reading for RFID tags upon an individual entering and exiting, respectively, through the entranceway;
   ii) executing an audit reading for RFID tags at least once after the individual has exited the entranceway;
   iii) returning an indicator that a target RFID tag is present in the storage facility if:
      1) the target RFID tag is detected upon the entrance reading and not detected on the exit reading; or
      2) if the target RFID tag is detected on the exit reading and the target RFID tag is detected on the audit reading;

d. wherein the system determines whether a phase angle of a signal from the target RFID tag changes over multiple detections of the target RFID tag; and e. wherein if (i) there is a change in phase angle in the exit reading, and (ii) the target RFID is detected in one or less of at least two audit readings, then an indicator is returned that the target RFID tag is not present in the storage facility.

21. The object tracking system according to claim 1, wherein if the system has not been instructed that the a target RFID tag is scheduled for move into the secured storage facility, an alert will be generated if the system determines that the target RFID have moved into the secured storage facility.

22. An object tracking system comprising:

a. an RFID reader having at least one antenna positioned along an interior entranceway of an object storage facility, the RFID reader employing a frequency hopping technique which transmits interrogation signals at different frequencies;

b. an entry/exit sensor capable of sensing entrance and departure of an individual through the entranceway;

c. a processor communicating with RFID reader;

d. the system running software to perform the steps of:
   i) executing an entrance reading and an exit reading for RFID tags upon an individual entering and exiting, respectively, through the entranceway;
   ii) normalizing detected phase angles to compensate for perceived phase shifts resulting from a change in interrogation signal frequency;
   iii) determining whether the normalized phase angle of a signal from the target RFID tag changes over multiple detections of the target RFID tag; and
   iv) returning an indicator that a target RFID tag is present or absent from the storage facility based at least in part on whether the normalized phase angle changes.

* * * * *